United States Patent
Tan et al.

(10) Patent No.: US 11,995,406 B2
(45) Date of Patent: May 28, 2024

(54) ENCODING METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventors: Yizhang Tan, Shenzhen (CN); Shuo Sun, Shenzhen (CN); Jie Cao, Shenzhen (CN); Le Tian, Shenzhen (CN); Cheng Niu, Shenzhen (CN); Jie Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 429 days.

(21) Appl. No.: 17/356,482

(22) Filed: Jun. 23, 2021

(65) Prior Publication Data

US 2021/0319167 A1    Oct. 14, 2021

Related U.S. Application Data

(63) Continuation of application No. PCT/CN2020/073360, filed on Jan. 21, 2020.

(30) Foreign Application Priority Data

Jan. 24, 2019    (CN) .................. 201910069751.1

(51) Int. Cl.
   *G06F 40/30*    (2020.01)
   *G06N 3/02*    (2006.01)
   *G06N 3/04*    (2023.01)

(52) U.S. Cl.
   CPC .............. *G06F 40/30* (2020.01); *G06N 3/02* (2013.01); *G06N 3/04* (2013.01)

(58) Field of Classification Search
   CPC .... G06F 40/30; G06F 16/3347; G06F 40/126; G06F 40/211; G06N 3/02; G06N 3/04; G06N 3/045; G06N 3/044; Y02D 10/00
   See application file for complete search history.

(56) References Cited

U.S. PATENT DOCUMENTS 9,336,192 B1 *    5/2016    Barba .................. G06F 40/284
10,332,508 B1 *    6/2019    Hoffmeister ............. G06N 3/08
(Continued)

FOREIGN PATENT DOCUMENTS

CN    106126596 A    11/2016
CN    108304911 A    7/2018
(Continued)

OTHER PUBLICATIONS

Long, Y., Wang, J., Xu, Z., Wang, Z., Wang, B., & Wang, Z. (2017). A knowledge enhanced generative conversational service agent. In Proceedings of the 6th Dialog System Technology Challenges (DSTC6) Workshop.) (Year: 2017).*

(Continued)

*Primary Examiner* — Michelle M Koeth
*Assistant Examiner* — Philip H Lam
(74) *Attorney, Agent, or Firm* — ANOVA LAW GROUP, PLLC

(57) ABSTRACT

An encoding method is provided for an encoding apparatus. The method includes obtaining a target paragraph and a preset database, and inputting the target paragraph and preset database into a memory encoding model, obtaining, in an input layer, an original vector set of the target paragraph and a knowledge vector set of the preset database, obtaining, in a first memory layer, a first target sentence matrix according to the original vector set and the knowledge vector set, and obtaining, in an output layer, a paragraph vector of the target paragraph according to the first target (Continued)

sentence matrix, and performing processing based on the paragraph vector.

20 Claims, 17 Drawing Sheets

(56) References Cited

U.S. PATENT DOCUMENTS

| | | | |
|---|---|---|---|
| 2004/0068396 A1* | 4/2004 | Kawatani | G06F 16/3347 707/E17.08 |
| 2016/0350653 A1 | 12/2016 | Socher et al. | |
| 2017/0200077 A1* | 7/2017 | Weston | G06F 40/279 |
| 2018/0082197 A1* | 3/2018 | Aravamudan | G16B 50/10 |
| 2018/0189272 A1 | 7/2018 | Noh et al. | |
| 2018/0336183 A1* | 11/2018 | Lee | G06N 5/022 |
| 2018/0357225 A1 | 12/2018 | Liu et al. | |
| 2020/0044993 A1 | 2/2020 | Wu | |
| 2020/0183963 A1* | 6/2020 | Ghaeini | G06F 16/3329 |
| 2021/0073459 A1* | 3/2021 | McCann | G06F 40/47 |

FOREIGN PATENT DOCUMENTS

| | | |
|---|---|---|
| CN | 108491386 A | 9/2018 |
| CN | 108536679 A | 9/2018 |
| CN | 108763567 A | 11/2018 |
| CN | 109086408 A | 12/2018 |
| CN | 110032633 A | 7/2019 |
| CN | 110147532 A | 8/2019 |
| CN | 110263324 A | 9/2019 |
| WO | 2018165932 A1 | 9/2018 |

OTHER PUBLICATIONS

The World Intellectual Property Organization (WIPO) International Search Report for PCT/CN2020/073360 dated Apr. 26, 2020 6 Pages (including translation).
Weiwei Wang, "Research on Question Answering Method of Large-scale Knowledge Base Based on Hierarchical Memory Network," China Excellent Master's Thesis Full-text Database Information Technology Series, Jan. 15, 2019 (Jan. 15, 2019). 78 pages.
Andrea Madotto et al., "Mem2Seq: Effectively Incorporating Knowledge Bases into End-to-End Task-Oriented Dialog Systems," In Proceedings of the 56th Annual Meeting of the Association for Computational Linguistics, 2018, pp. 1468-1478. 11 pages.
China National Intellectual Property Administration (CNIPA) Office Action 1 for 201910069751.1 dated May 15, 2023 13 Pages (including translation).

* cited by examiner

ENCODING METHOD, APPARATUS, AND DEVICE, AND STORAGE MEDIUM

RELATED APPLICATION(S)

This application is a continuation application of PCT Patent Application No. PCT/CN2020/073360, entitled "ENCODING METHOD, APPARATUS, AND DEVICE, AND STORAGE MEDIUM" and filed on Jan. 21, 2020, which claims priority to Chinese Patent Application No. 201910069751.1, entitled "ENCODING METHOD, APPARATUS, AND DEVICE, AND STORAGE MEDIUM" and filed with the China National Intellectual Property Administration on Jan. 24, 2019, all of which are incorporated by reference in entirety.

FIELD OF THE TECHNOLOGY

The present disclosure relates to the field of natural language processing, and in particular, to an encoding method, apparatus, and device, and a storage medium.

BACKGROUND

Encoding is a process of converting a text into an encoded value to obtain a vector that describes a meaning of the text. Encoding can be performed to convert text into a form of a vector that is convenient for computing, and has been widely applied to many fields such as sentence selection and sentence generation.

In a hierarchical encoding solution, and when a target paragraph including a plurality of sentences is to be encoded, a word vector of each word in each sentence in the target paragraph is obtained. For each sentence in the target paragraph, the word vector of the each word in the sentence is encoded into a vector by applying a word-based first encoding model, to obtain a sentence vector of the sentence, and further obtain sentence vectors of the plurality of sentences in the target paragraph. The sentence vectors of the plurality of sentences are further encoded into one vector by applying a sentence-based second encoding model, to obtain a paragraph vector of the target paragraph.

In the hierarchical encoding solution, vectors of each sentence in a target paragraph are encoded in sequence in a serial manner, and further, a plurality of sentence vectors are encoded in the serial manner, resulting in a relatively low encoding speed and relatively low accuracy.

SUMMARY

In one aspect, the present disclosure provides an encoding method. The encoding method includes: obtaining a target paragraph and a preset database, and inputting the target paragraph and the preset database into a memory encoding model, the target paragraph including at least one sentence, and the memory encoding model including at least an input layer, a first memory layer, and an output layer; obtaining, in the input layer, an original vector set of the target paragraph and a knowledge vector set of the preset database, the original vector set including a sentence vector of each sentence in the target paragraph, and the knowledge vector set including knowledge vectors of a plurality of pieces of knowledge data in the preset database; obtaining, in the first memory layer, a first target sentence matrix of the original vector set according to the original vector set and the knowledge vector set, the first target sentence matrix being configured to describe the target paragraph according to an association relationship between the original vector set and the knowledge vector set; obtaining, in the output layer, a paragraph vector of the target paragraph according to the first target sentence matrix; and performing processing based on the paragraph vector.

In another aspect, the present disclosure provides an encoding apparatus. The encoding apparatus includes a memory storing computer program instructions, and a processor coupled to the memory and configured to execute the computer program instructions and perform: obtaining a target paragraph and a preset database, and inputting the target paragraph and the preset database into a memory encoding model, the target paragraph including at least one sentence; obtaining an original vector set of the target paragraph and a knowledge vector set of the preset database, the original vector set including a sentence vector of each sentence in the target paragraph, and the knowledge vector set including knowledge vectors of a plurality of pieces of knowledge data in the preset database; obtaining a first target sentence matrix of the original vector set according to the original vector set and the knowledge vector set, the first target sentence matrix being configured to describe the target paragraph according to an association relationship between the original vector set and the knowledge vector set; obtaining a paragraph vector of the target paragraph according to the first target sentence matrix; and performing processing based on the paragraph vector.

In yet another aspect, the present disclosure provides a non-transitory computer-readable storage medium storing computer program instructions executable by at least one processor to perform: obtaining a target paragraph and a preset database, and inputting the target paragraph and the preset database into a memory encoding model, the target paragraph including at least one sentence, and the memory encoding model including at least an input layer, a first memory layer, and an output layer; obtaining, in the input layer, an original vector set of the target paragraph and a knowledge vector set of the preset database, the original vector set including a sentence vector of each sentence in the target paragraph, and the knowledge vector set including knowledge vectors of a plurality of pieces of knowledge data in the preset database; obtaining, in the first memory layer, a first target sentence matrix of the original vector set according to the original vector set and the knowledge vector set, the first target sentence matrix being configured to describe the target paragraph according to an association relationship between the original vector set and the knowledge vector set; obtaining, in the output layer, a paragraph vector of the target paragraph according to the first target sentence matrix; and performing processing based on the paragraph vector.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent

DESCRIPTION OF EMBODIMENTS

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Embodiments of the present disclosure provide a memory encoding model. A target paragraph and a preset database are obtained and inputted into the memory encoding model. The target paragraph may be encoded by applying the memory encoding model, to obtain a paragraph vector of the target paragraph, so that processing can be performed based on the paragraph vector. In an encoding process, the target paragraph may be used as a unit, and the target paragraph may be encoded at a time by applying the memory encoding model without separately encoding each sentence in the target paragraph in a serial manner. Moreover, both a meaning of the each sentence in the target paragraph and knowledge data in the preset database are considered, so that not only the obtained paragraph vector can express a meaning of the target paragraph, but also related knowledge data can be extracted from external knowledge data, to enable the obtained paragraph vector to more accurately express the meaning of the target paragraph and improve accuracy during processing based on the paragraph vector.

Figure 1:
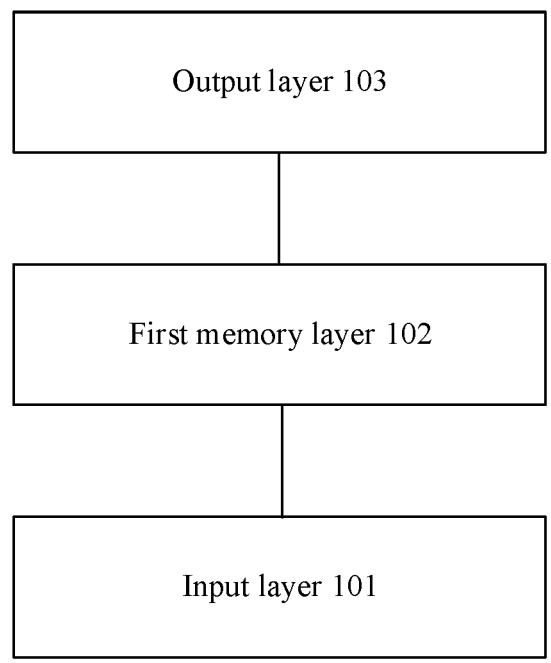
FIG. 1 is a schematic structural diagram of a memory encoding model according to one or more embodiments of the present disclosure.

Referring to FIG. 1, the memory encoding model includes an input layer 101, a first memory layer 102, and an output layer 103. The input layer 101 is connected to the first memory layer 102, and the first memory layer 102 is connected to the output layer 103.

The input layer 101 extracts, according to each sentence in a target paragraph, a sentence vector representing a meaning of the sentence, to obtain an original vector set of the target paragraph, and inputs the original vector set into the first memory layer 102. The input layer 101 further obtains, according to each piece of knowledge data in a preset database, a knowledge vector of the each piece of knowledge data, combines a plurality of obtained knowledge vectors into a knowledge vector set, and inputs the knowledge vector set into the first memory layer 102. The first memory layer 102 obtains a first target sentence matrix according to the inputted original vector set and knowledge vector set, and inputs the first target sentence matrix into the output layer 103; and the output layer 103 obtains a paragraph vector of the target paragraph according to the first target sentence matrix.

Because the first memory layer 102 can extract knowledge data related to the original vector set from the knowledge vector set by using an attention learning mechanism, a more accurate paragraph vector can be obtained.

In certain embodiments, the memory encoding model repeatedly runs the first memory layer 102, uses the first target sentence matrix outputted by the first memory layer 102 as an original vector set of the first memory layer 102, keeps the knowledge vector set unchanged or updates the knowledge vector set to obtain an updated knowledge vector set, re-inputs the original vector set and/or the knowledge vector set and/or the updated knowledge vector set into the first memory layer 102, repeatedly runs the first memory layer 102 until a quantity of repetitions reaches a preset quantity of times, and inputs a current target sentence matrix into the output layer 103, to obtain the paragraph vector of the target paragraph. The preset quantity of times may be two or three, or may be another value.

Figure 2:
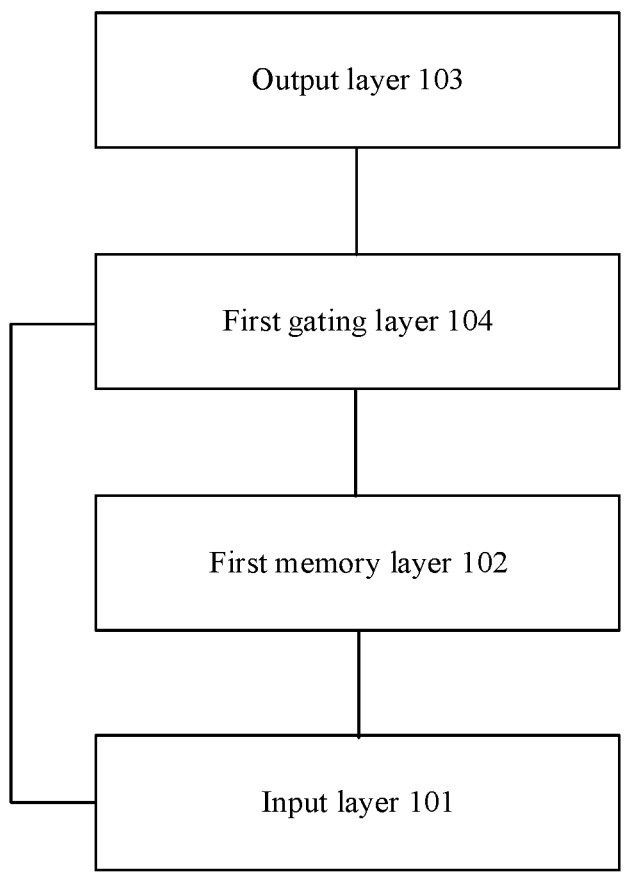
FIG. 2 is a schematic structural diagram of a memory encoding model according to one or more embodiments of the present disclosure.

In certain embodiments, based on the memory encoding model shown in FIG. 1, referring to FIG. 2, the memory encoding model further includes a first gating layer 104. The input layer 101 is connected to the first memory layer 102 and the first gating layer 104, the first memory layer 102 is connected to the first gating layer 104, and the first gating layer 104 is connected to the output layer 103. That is, the embodiments of the present disclosure provide a gated self-attentive memory network (GSMN) model.

After obtaining the first target sentence matrix, the first memory layer 102 inputs the first target sentence matrix into the first gating layer 104. The first gating layer 104 performs weighted summation on the original vector set and the first target sentence matrix, to obtain a second target sentence matrix, and inputs the second target sentence matrix into the output layer 103. The output layer 103 obtains the paragraph vector of the target paragraph according to the second target sentence matrix.

In certain embodiments, the memory encoding model repeatedly runs the first memory layer 102 and the first gating layer 104, re-inputs the second target sentence matrix outputted by the first gating layer 104 as an original vector set and a knowledge vector set of the first memory layer 102 into the first memory layer 102, repeatedly runs the first memory layer 102 and the first gating layer 104 until a quantity of repetitions reaches the preset quantity of times, and inputs a current target sentence matrix into the output layer 103, to obtain the paragraph vector of the target paragraph.

Figure 3:
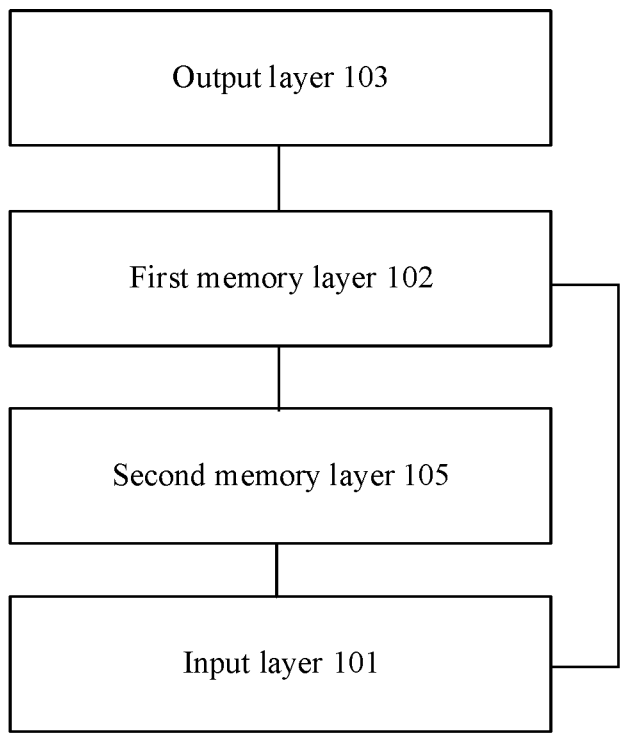
FIG. 3 is a schematic structural diagram of a memory encoding model according to one or more embodiments of the present disclosure.

In certain embodiments, referring to FIG. 3, the memory encoding model further includes a second memory layer 105. The second memory layer 105 is located before the first memory layer 102, the input layer 101 is connected to the first memory layer 102 and the second memory layer 105, the second memory layer 105 is connected to the first memory layer 102, and the first memory layer 102 is connected to the output layer 103.

The input layer 101 obtains, according to each word in a context sentence of the target paragraph, a word vector of the each word, combines a plurality of obtained word vectors into a memory vector set, and inputs the original vector set and the memory vector set into the second memory layer 105. The second memory layer 105 obtains a third target sentence matrix according to the original vector set and the memory vector set that are inputted, and inputs the third target sentence matrix into the first memory layer 102. The first memory layer 102 obtains the first target sentence matrix according to the inputted third target sentence matrix and the knowledge vector set, and inputs the first target sentence matrix into the output layer 103, and the output layer 103 obtains the paragraph vector of the target paragraph according to the first target sentence matrix.

In certain embodiments, the memory encoding model repeatedly runs the second memory layer 105 and the first memory layer 102, re-inputs the first target sentence matrix outputted by the first memory layer 102 as an original vector set and a memory vector set of the second memory layer 105 into the second memory layer 105, repeatedly runs the second memory layer 105 and the first memory layer 102 until a quantity of repetitions reaches the preset quantity of times, and inputs a current target sentence matrix into the output layer 103, to obtain the paragraph vector of the target paragraph.

Figure 4:
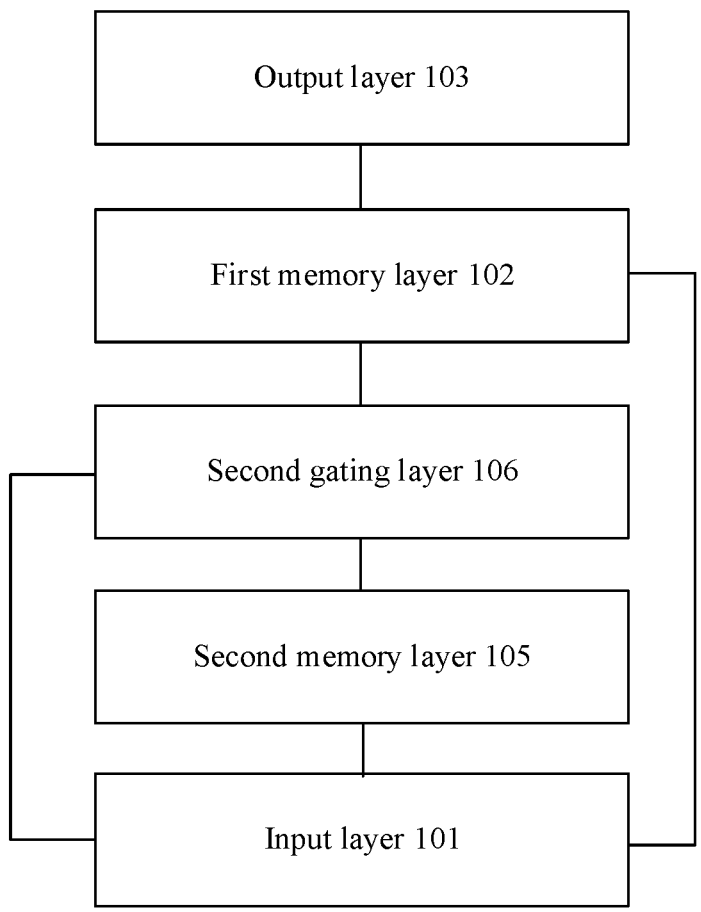
FIG. 4 is a schematic structural diagram of a memory encoding model according to one or more embodiments of the present disclosure.

In certain embodiments, referring to FIG. 4, the memory encoding model further includes a second gating layer 106. The second gating layer 106 is located before the first memory layer 102 and behind the second memory layer 105. The input layer 101 is connected to the second memory layer 105, the second gating layer 106, and the first memory layer 102, the second memory layer 105 is connected to the second gating layer 106, the second gating layer 106 is connected to the first memory layer 102, and the first memory layer 102 is connected to the output layer 103.

After obtaining the third target sentence matrix, the second memory layer 105 inputs the third target sentence matrix into the second gating layer 106. The second gating layer 106 performs weighted summation on the original vector set and the third target sentence matrix, to obtain a fourth target sentence matrix, and inputs the fourth target sentence matrix into the first memory layer 102. The first memory layer 102 obtains the first target sentence matrix according to the fourth target sentence matrix and the knowledge vector set, and inputs the first target sentence matrix into the output layer 103, and the output layer 103 obtains the paragraph vector of the target paragraph according to the first target sentence matrix.

In certain embodiments, the memory encoding model repeatedly runs the second memory layer 105, the second gating layer 106, and the first memory layer 102. The first target sentence matrix outputted by the first memory layer 102 is re-inputted as the original vector set and the memory vector set of the second memory layer 105 into the second memory layer 105, the second memory layer 105, the second gating layer 106, and the first memory layer 102 are run repeatedly until a quantity of repetitions reaches the preset quantity of times, and a current target sentence matrix is inputted into the output layer 103, to obtain the paragraph vector of the target paragraph.

The memory encoding model shown in FIG. 3 or FIG. 4 may be combined with the memory encoding model shown in FIG. 2, and the obtained memory encoding model includes an input layer, a second memory layer, a first memory layer, a first gating layer, and an output layer, or the memory encoding model includes an input layer, a second memory layer, a second gating layer, a first memory layer, a first gating layer, and an output layer.

A processing manner in this case is similar to the foregoing processing manner of the memory encoding model, and details are not described herein again.

Figure 5:
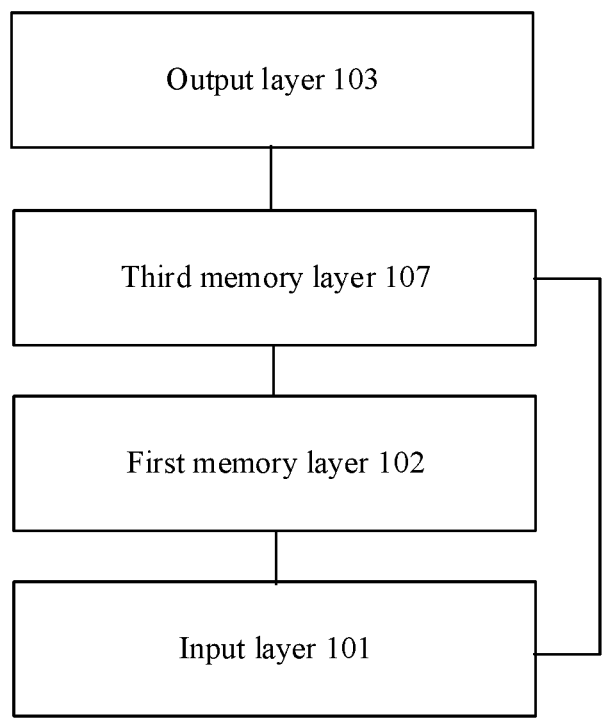
FIG. 5 is a schematic structural diagram of a memory encoding model according to one or more embodiments of the present disclosure.

In another possible implementation, based on the memory encoding model shown in FIG. 1, referring to FIG. 5, the memory encoding model further includes a third memory layer 107. The third memory layer 107 is located behind the first memory layer 102, the input layer 101 is connected to the first memory layer 102 and the third memory layer 107, and the first memory layer 102 is connected to the third memory layer 107. After obtaining the first target sentence matrix, the first memory layer 102 inputs the first target sentence matrix into the third memory layer 107, the third memory layer 107 obtains a fifth target sentence matrix according to the memory vector set and the first target sentence matrix, and inputs the fifth target sentence matrix into the output layer 103, and the output layer 103 obtains the paragraph vector of the target paragraph according to the fifth target sentence matrix.

In certain embodiments, the memory encoding model repeatedly runs the third memory layer 107. After obtaining the fifth target sentence matrix, the third memory layer 107 uses the fifth target sentence matrix as an updated first target sentence matrix and the memory vector set. The third memory layer 107 repeatedly performs the step of obtaining a target sentence matrix according to the updated first target sentence matrix and the memory vector set until a quantity of repetitions reaches the preset quantity of times, and inputs a current target sentence matrix into the output layer 103. The output layer 103 obtains the paragraph vector of the target paragraph according to the current target sentence matrix.

Figure 6:
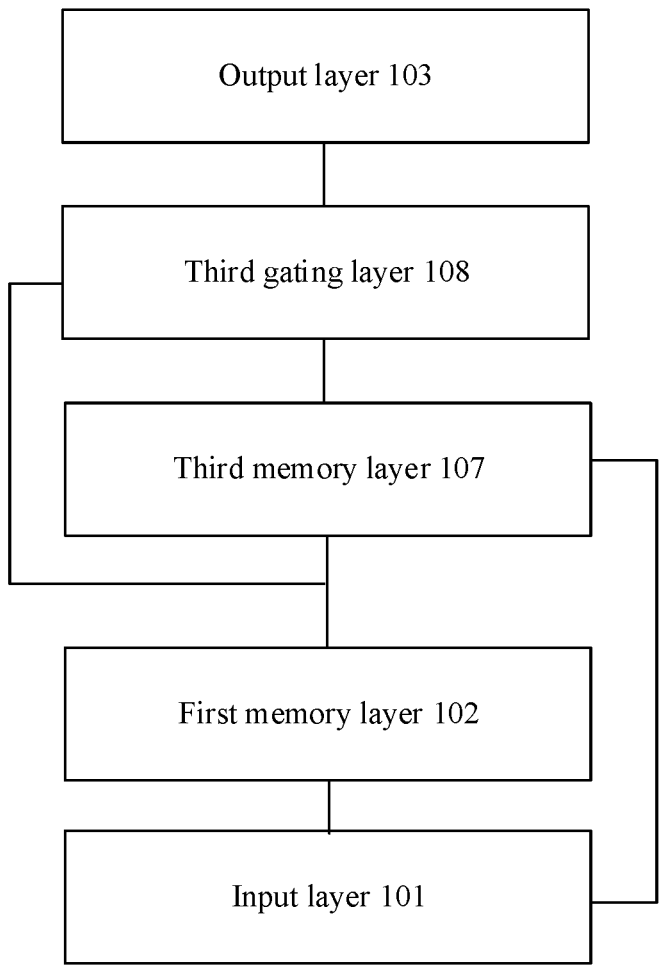
FIG. 6 is a schematic structural diagram of a memory encoding model according to one or more embodiments of the present disclosure.

In certain embodiments, referring to FIG. 6, the memory encoding model further includes a third gating layer 108. The third gating layer 108 is located behind the third memory layer 107, the input layer 101 is connected to the first memory layer 102 and the third memory layer 107, the first memory layer 102 is connected to the third memory layer 107 and the third gating layer 108, and the third memory layer 107 is connected to the third gating layer 108.

After obtaining the fifth target sentence matrix, the third memory layer 107 inputs the fifth target sentence matrix into the third gating layer 108, the third gating layer 108 performs weighted summation on the fifth target sentence matrix and the first target sentence matrix, to obtain a sixth target sentence matrix, and inputs the sixth target sentence matrix into the output layer 103, and the output layer 103 obtains the paragraph vector of the target paragraph according to the sixth target sentence matrix.

In certain embodiments, the memory encoding model repeatedly runs the third memory layer 107 and the third gating layer 108. After obtaining the sixth target sentence matrix, the third gating layer 108 uses the sixth target sentence matrix as an updated first target sentence matrix and the memory vector set. The third memory layer 107 and the third gating layer 108 repeatedly perform the step of obtaining a target sentence matrix according to the updated first target sentence matrix and the memory vector set until a quantity of repetitions reaches the preset quantity of times, and inputs a current target sentence matrix into the output layer 103. The output layer 103 obtains the paragraph vector of the target paragraph according to the current target sentence matrix.

The memory encoding model shown in FIG. 5 or FIG. 6 may be combined with the memory encoding model shown in FIG. 2, and the obtained memory encoding model includes an input layer, a first memory layer, a first gating layer, a third memory layer, and an output layer, or the memory encoding model includes an input layer, a first memory layer, a first gating layer, a third memory layer, a third gating layer, and an output layer.

A processing manner in this case is similar to the foregoing processing manner of the memory encoding model, and details are not described herein again.

A plurality of repeatedly running manners may be used for the different model architectures, that is, any one or more memory layers or any one or more gating layers in the memory encoding model may be repeatedly run, and for a plurality of layers, a next layer may be run repeatedly after each layer has been repeatedly run, or a plurality of layers may be considered as a whole and run together a plurality of times.

The embodiments of the present disclosure may be applied to a scenario in which any paragraph is encoded.

For example, in a scenario of an intelligent dialog, a user has a dialog with a chatbot, and the chatbot may obtain a text message inputted by the user as a target paragraph. By using the method provided in the embodiments of the present disclosure, the target paragraph is encoded to obtain a paragraph vector, the paragraph vector is matched with vectors of a plurality of reply messages in a corpus database, to obtain a reply message of which a vector matches the paragraph vector, and the reply message is displayed to the user, thereby implementing a dialog between the user and the chatbot.

Because the text message inputted by the user and knowledge data in a preset database are considered in an encoding process, a generated paragraph vector is relatively accurate, to enable the chatbot to better understand a meaning that the user wants to express. A reply message that matches better may be obtained according to the paragraph vector, and a reply that meets a requirement of the user better can be provided for the text message inputted by the user, thereby improving a dialog effect.

In another example, in a scenario of text classification, a to-be-classified target paragraph is obtained. By using the method provided in the embodiments of the present disclosure, the target paragraph is encoded to obtain a paragraph vector, and classification is performed according to the paragraph vector, to determine a category to which the target paragraph belongs.

Because the knowledge data in the preset database is considered in the encoding process, a generated paragraph vector is relatively accurate, to enable the meaning of the target paragraph to be better understood. Classification is performed according to the paragraph vector, to improve classification accuracy.

In another example, in a scenario of paragraph selection, a plurality of to-be-selected target paragraphs are obtained. By using the method provided in the embodiments of the present disclosure, each target paragraph is encoded to obtain a paragraph vector, and a target paragraph meeting a requirement is selected from the plurality of target paragraphs according to paragraph vectors of the plurality of target paragraphs.

Because the knowledge data in the preset database is considered in the encoding process, a generated paragraph vector is relatively accurate, to enable the meaning of the target paragraph to be better understood. Selection is performed according to the paragraph vector, so the target paragraph meeting the requirement can be selected, thereby avoiding a problem of incorrect selection.

In addition to the foregoing scenarios, the method provided in the embodiments of the present disclosure may further be applied to another scenario such as reading or understanding. This is not limited in the embodiments of the present disclosure.

Figure 7:
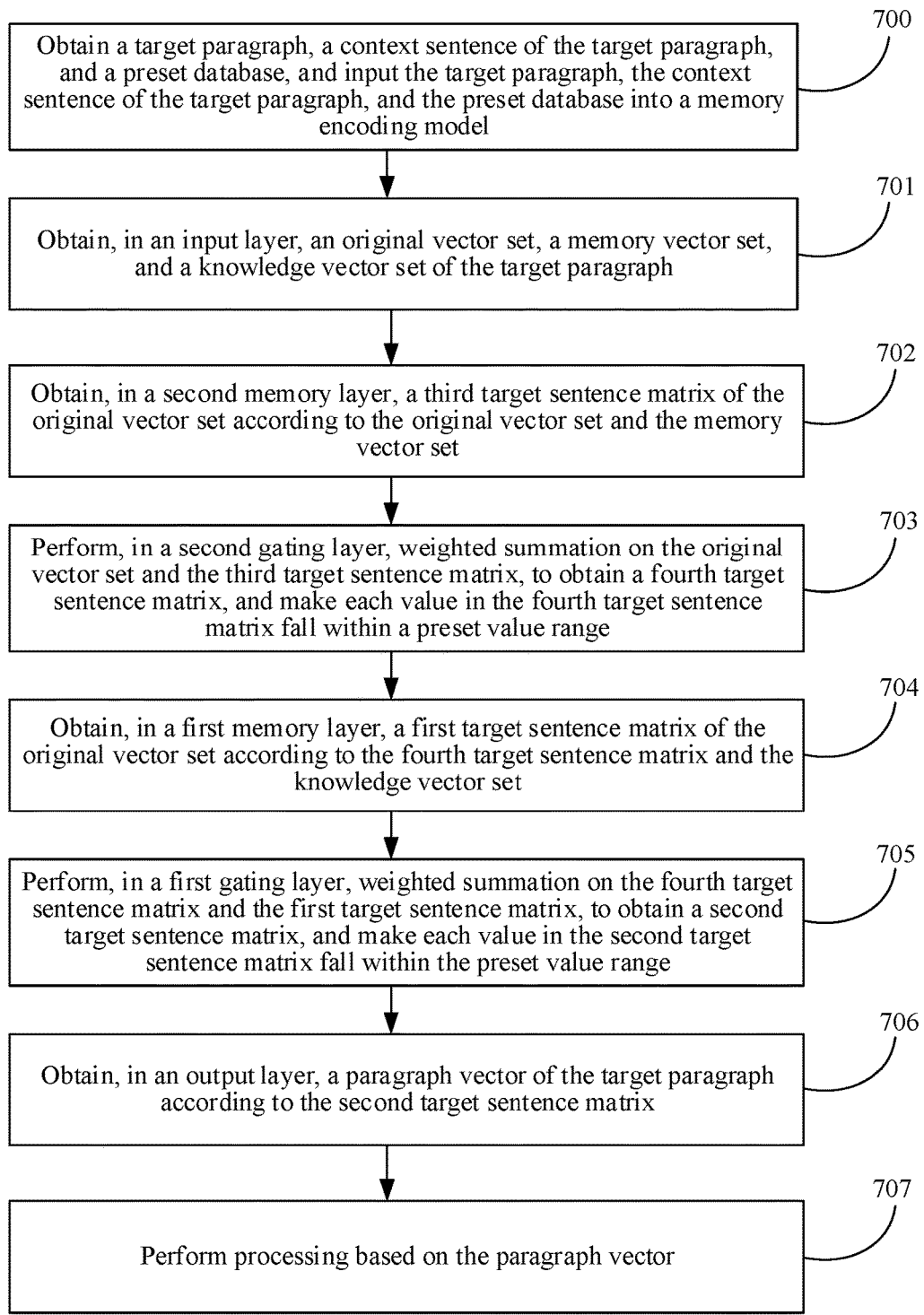
FIG. 7 is a schematic flowchart of an encoding method according to one or more embodiments of the present disclosure.

FIG. 7 is a flowchart of an encoding method according to an embodiment of the present disclosure. In this embodiment of the present disclosure, a process of encoding a target paragraph by applying a memory encoding model is described. The memory encoding model includes an input layer, a second memory layer, a second gating layer, a first memory layer, a first gating layer, and an output layer. This embodiment of the present disclosure is executed by an encoding device, and the encoding device may be a server or may be a terminal such as a smartphone or a computer. Referring to FIG. 7, the method includes the following steps:

700. Obtain a target paragraph, a context sentence of the target paragraph, and a preset database, and input the target paragraph, the context sentence of the target paragraph, and the preset database into a memory encoding model.

The target paragraph includes at least one sentence, and each sentence includes at least one word. The context sentence of the target paragraph may include sentences in one or more paragraphs before the target paragraph or sentences in one or more paragraphs following the target paragraph, or may include one or more sentences in the target paragraph. For example, the context sentence of the target paragraph may be an original text of the target paragraph.

In certain embodiments, the target paragraph is one paragraph in a specific article, and the context sentence may include a sentence before or following the paragraph in the article or may include a sentence in the paragraph. Alternatively, the target paragraph is a specific text inputted by a user in a scenario of an intelligent dialog, and the context sentence may include a text inputted by the user before the target paragraph or a text in the target paragraph, or may include a text replied by a chatbot to the user before the target paragraph or the like.

In addition, the preset database includes at least one piece of knowledge data, and the at least one piece of knowledge data may include a plurality of types such as news, entertainment, and professional knowledge. Moreover, the knowledge data in the preset database may be uploaded by maintenance personnel, or may be data that is uploaded by a plurality of network users and that is collected by the encoding device, or may be set in another manner. Furthermore, during use, the knowledge data in the preset database may be fixed, or may be updated according to requirements.

In certain embodiments, each piece of knowledge data may include at least one sentence, and each sentence includes at least one word. Alternatively, each piece of knowledge data includes at least one key-value pair, and each key-value pair includes a key and a value.

For example, one piece of knowledge data in the preset database may be shown in Table 1.

TABLE 1

| Key | Value |
| --- | --- |
| Name | Zhang San |
| Occupation | Hospital Director |
| Nationality | China |

When a target paragraph is to be encoded, the target paragraph, a context sentence of the target paragraph, and a preset database are obtained and inputted into the memory encoding model.

701. Obtain, in an input layer, an original vector set, a memory vector set, and a knowledge vector set of the target paragraph.

The input layer is a first layer in the memory encoding model. When a target paragraph is to be encoded, the target paragraph, a context sentence of the target paragraph, and a preset database are inputted into the input layer, and the target paragraph, the context sentence of the target paragraph, and the preset database are separately processed in the input layer, to obtain an original vector set, a memory vector set, and a knowledge vector set of the target paragraph.

The original vector set includes a sentence vector of each sentence in the target paragraph, the memory vector set includes a word vector of each word in the context sentence of the target paragraph, and the knowledge vector set includes knowledge vectors of a plurality of pieces of knowledge data in the preset database.

In this embodiment of the present disclosure, during encoding on the target paragraph, not only the target paragraph may need to be considered, but also the context sentence of the target paragraph and the knowledge data in the preset database may need to be considered. Therefore, not only the original vector set may need to be obtained, but also the memory vector set and the knowledge vector set may need to be obtained, and subsequent processing is performed according to the original vector set, the memory vector set, and the knowledge vector set.

Figure 7A:
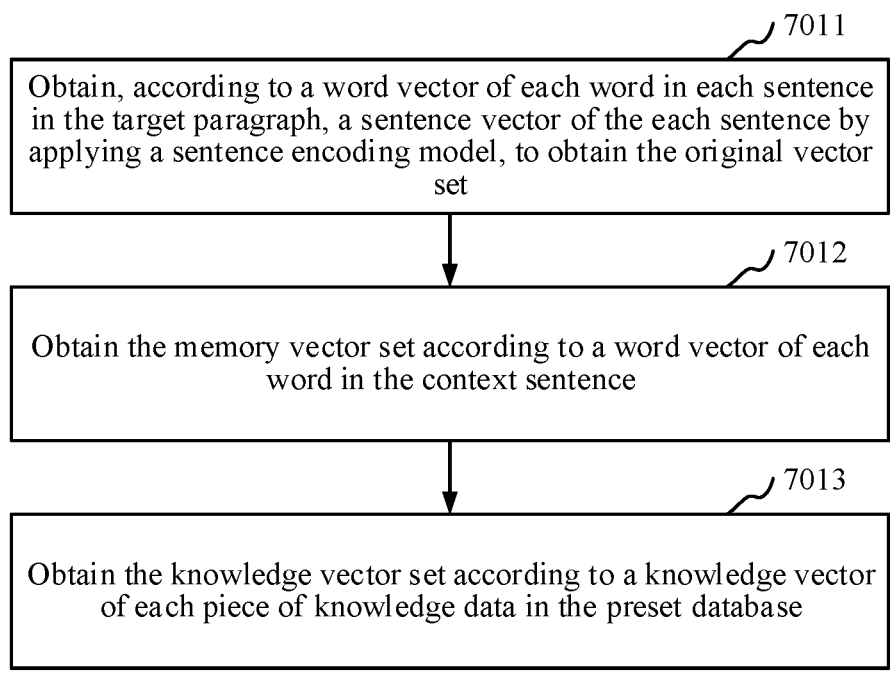
FIG. 7A is a schematic flowchart of obtaining, in an input layer, an original vector set, a memory vector set, and a knowledge vector set of a target paragraph according to one or more embodiments of the present disclosure.

In certain embodiments, as shown in FIG. 7A, step 701 may include the following steps 7011 to 7013:

7011. Obtain, according to a word vector of each word in each sentence in the target paragraph, a sentence vector of the each sentence by applying a sentence encoding model, to obtain the original vector set.

First, the target paragraph is pre-processed. The pre-processing process includes: performing sentence division on the target paragraph to obtain each sentence in the target paragraph, performing word segmentation on the each sentence to obtain each word in the each sentence, and obtaining a word vector of the each word.

For the sentence division process, a punctuation, such as a full stop, a question mark, or an exclamation mark, that is in the target paragraph and that can represent that a corresponding sentence has ended may be obtained, and the sentence in the target paragraph may be obtained by dividing the target paragraph according to the obtained punctuation.

For a word segmentation process, word segmentation may be performed on each sentence by using a word segmentation algorithm, and the word segmentation algorithm may include a plurality of algorithms such as a two-way maximum matching algorithm and a minimum segmentation algorithm. Alternatively, the word segmentation is performed in another manner.

In a process of obtaining the word vector, for each word, a word vector corresponding to the word may be queried for according to a word vector dictionary. The word vector dictionary may include a correspondence between a word and a word vector, or the word vector dictionary may be a word vector obtaining model, for example, a recurrent neural network model, a deep learning network model, or a convolutional neural network model. The word vector of the word may be obtained by applying the word vector obtaining model.

After the target paragraph is pre-processed, for each sentence, a word vector of each word in the sentence is processed by applying the sentence encoding model, to obtain a sentence vector of the sentence, thereby obtaining a sentence vector of the each sentence in the target paragraph. The original vector set is formed through combination according to the sentence vector of the each sentence.

The sentence encoding model is configured to compress word vectors of a plurality of words in any sentence into one sentence vector representing a meaning of the sentence, and may be a plurality of types of models such as a recurrent neural network model, a deep learning network model, a convolutional neural network model, a transformation neural network model, and a word-based GSMN model.

In certain embodiments, the sentence encoding model includes a first sentence encoding submodel and a second sentence encoding submodel, and a process of obtaining the sentence vector of the sentence may include: for each sentence in the target paragraph, obtaining a word vector of each word in the sentence to obtain a plurality of word vectors; performing forward-order encoding on the plurality of word vectors by applying the first sentence encoding submodel, to obtain a first vector, and performing reverse-order encoding on the plurality of word vectors by applying the second sentence encoding submodel, to obtain a second vector; and obtaining the sentence vector of the sentence according to the first vector and the second vector. The sentence vector of the each sentence in the target paragraph may be obtained by repeatedly performing the foregoing steps.

In one or more embodiments of the present disclosure, the term "submodel" refers to a model, or a part or a component of a model. In certain embodiments, and by way of example, the first sentence encoding submodel is a part or a component of the sentence encoding model, and the second sentence submodel is a part or a component of the sentence encoding model.

The first sentence encoding submodel is a forward-order encoding model, and the second sentence encoding submodel is a reverse-order encoding model. Word vectors of a plurality of words in the sentence are arranged according to an order. Forward-order encoding is performed on the plurality of word vectors according to an arrangement order of the plurality of word vectors by applying the first sentence encoding submodel, to obtain the first vector. Reverse-order processing is performed on the plurality of word vectors by applying the second sentence encoding submodel, and then reverse-order encoding is performed on the plurality of word vectors according to an arrangement order after the reverse-order processing is performed, to obtain the second vector.

In addition, after the first vector and the second vector are obtained, the first vector and the second vector may be concatenated to obtain the sentence vector, or the first vector and the second vector are added to obtain the sentence vector, or the sentence vector may be obtained in another manner.

Figure 8:
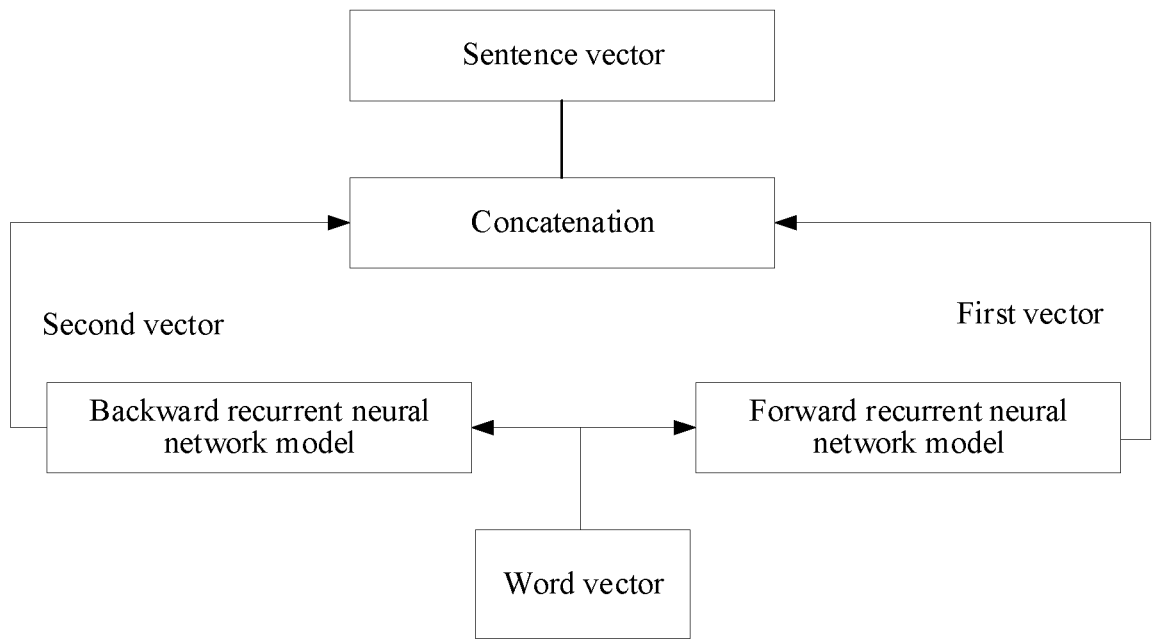
FIG. 8 is a schematic structural diagram of a sentence encoding model according to one or more embodiments of the present disclosure.
Figure 9:
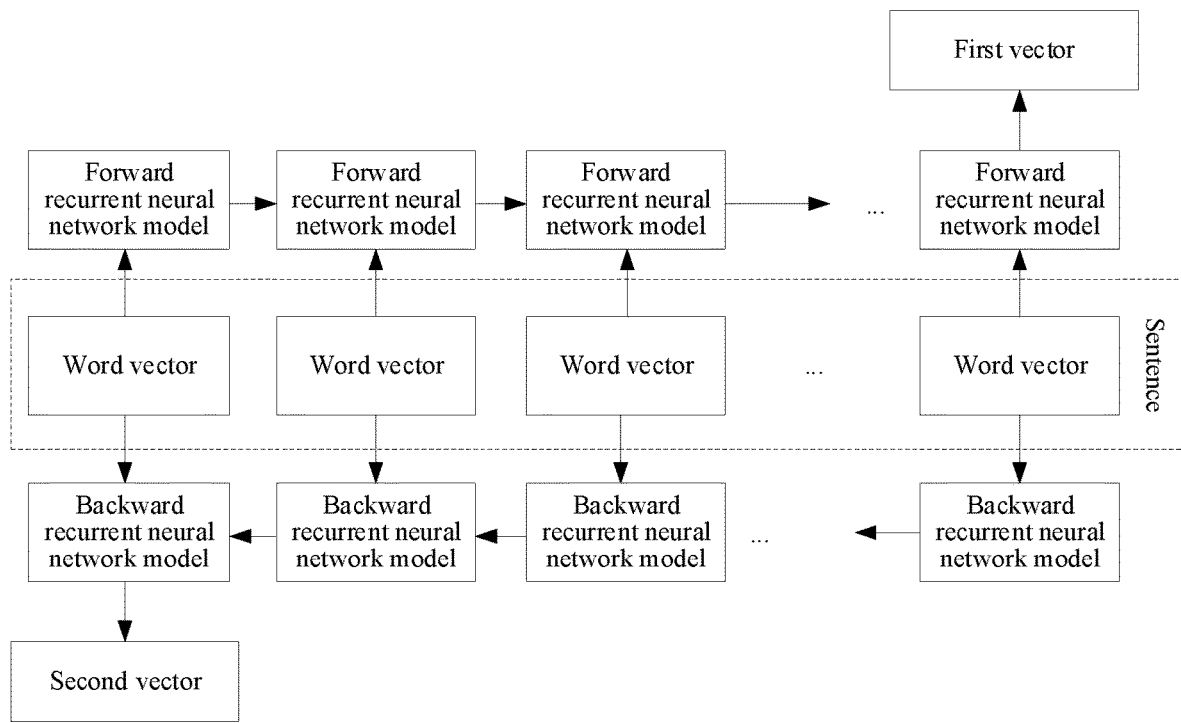
FIG. 9 is a schematic flowchart of a sentence encoding model according to one or more embodiments of the present disclosure.

Description is made by using an example in which the sentence encoding model is a bidirectional recurrent neural network model. As shown in FIG. 8 and FIG. 9, the bidirectional recurrent neural network model includes a forward recurrent neural network model and a backward recurrent neural network model. Forward-order encoding is performed on a plurality of word vectors of a sentence by using the forward recurrent neural network model, to obtain a first vector, reverse-order encoding is performed on the plurality of word vectors of the sentence by using the backward recurrent neural network model, to obtain a second vector, and the first vector and the second vector are concatenated, to obtain a sentence vector of the sentence.

7012. Obtain the memory vector set according to a word vector of each word in the context sentence.

Word segmentation is performed on the context sentence to obtain each word in the context sentence, and a word vector of the each word is then obtained, to form a memory vector set through combination according to the obtained word vector. A process of performing word segmentation and obtaining a word vector of a word is similar to that in the foregoing step 7011. Details are not described herein again.

Figure 10:
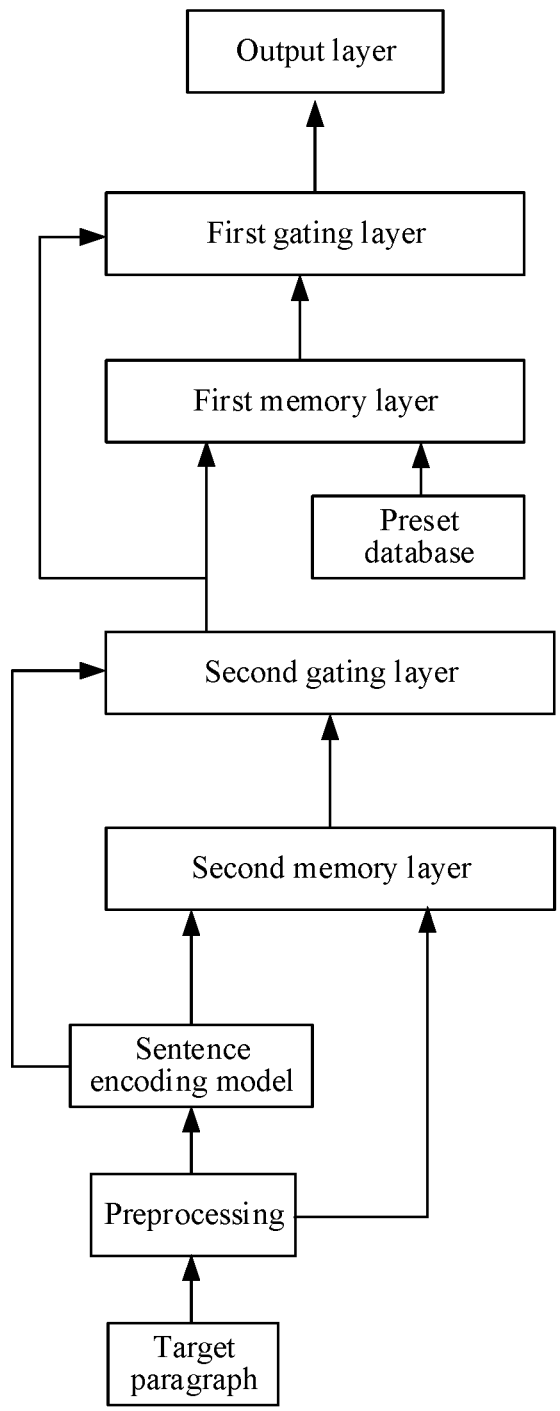
FIG. 10 is a schematic structural diagram of a memory encoding model according to one or more embodiments of the present disclosure.

If the target paragraph is the same as the context sentence, the original vector set and the memory vector set may be obtained by only processing a sentence in the target paragraph without processing another sentence. As shown in FIG. 10, the memory vector set is obtained according to the word vector obtained after the target paragraph is pre-processed.

In this embodiment of the present disclosure, the memory encoding model performs encoding in a unit of a target paragraph. Therefore, the input layer inputs both the obtained original vector set and memory vector set into a memory layer for processing.

7013. Obtain the knowledge vector set according to a knowledge vector of each piece of knowledge data in the preset database.

A knowledge vector of each piece of knowledge data in the preset database is obtained, and one or more knowledge vectors of at least one piece of knowledge data are combined into the knowledge vector set.

The knowledge vector of the each piece of knowledge data may be obtained by pre-processing the preset database in advance, and the knowledge vector may be obtained in a plurality of manners. In certain embodiments, each piece of knowledge data in the preset database is obtained, for the each piece of knowledge data, word segmentation is performed on the knowledge data to obtain at least one word in the knowledge data, a word vector of the at least one word is obtained, a knowledge vector of the knowledge data is obtained according to the word vector of the at least one word, and the knowledge vector and the knowledge data are correspondingly stored in the preset database.

For a word segmentation process, word segmentation may be performed on each piece of knowledge data by using a word segmentation algorithm, and the word segmentation algorithm may include a plurality of algorithms such as a two-way maximum matching algorithm and a minimum segmentation algorithm. Alternatively, the word segmentation is performed in another manner. In certain embodiments, the each piece of knowledge data includes at least one key-value pair, and the word segmentation may be separately performed on a key and a value in a key-value pair of the each piece of knowledge data by using the word segmentation algorithm.

In a process of obtaining the word vector, for each word, a word vector corresponding to the word may be queried for according to a word vector dictionary. The word vector dictionary may include a correspondence between a word and a word vector, or the word vector dictionary may be a word vector obtaining model, for example, a recurrent neural network model, a deep learning network model, or a convolutional neural network model. The word vector of the word may be obtained by applying the word vector obtaining model.

In a process of obtaining the knowledge vector, the word vector of the at least one word in the knowledge data is concatenated, to obtain the knowledge vector of the knowledge data. In certain embodiments, when the knowledge data includes a plurality of key-value pairs, for each key-value pair, one or more word vectors of at least one word in the key-value pair are combined into one vector, that is, a vector of the key-value pair. Vectors of a plurality key-value pairs can be obtained in a similar manner. Subsequently, the vectors of the plurality of key-value pairs are compressed to obtain the knowledge vector of the knowledge data, and a knowledge vector of each piece of knowledge data in the preset database can be obtained in a similar manner.

Compression processing may be performed in a plurality of manners. For example, vectors of a plurality of key-value pairs may be combined into one matrix, and column vector summation is performed on the matrix, that is, the matrix is divided into a plurality of column vectors, and a sum of values in each column vector is calculated, to obtain a total value of the each column vector, and the total values of the plurality of column vectors are combined into one vector, to obtain the knowledge vector. Alternatively, an encoding model may be applied to compressing vectors of a plurality of key-value pairs. The encoding model is configured to compress a plurality of vectors into one vector, and may be a plurality of types of models such as a recurrent neural network model, a deep learning network model, a convolutional neural network model, a transformation neural network model, and a word-based GSMN model.

Figure 11:
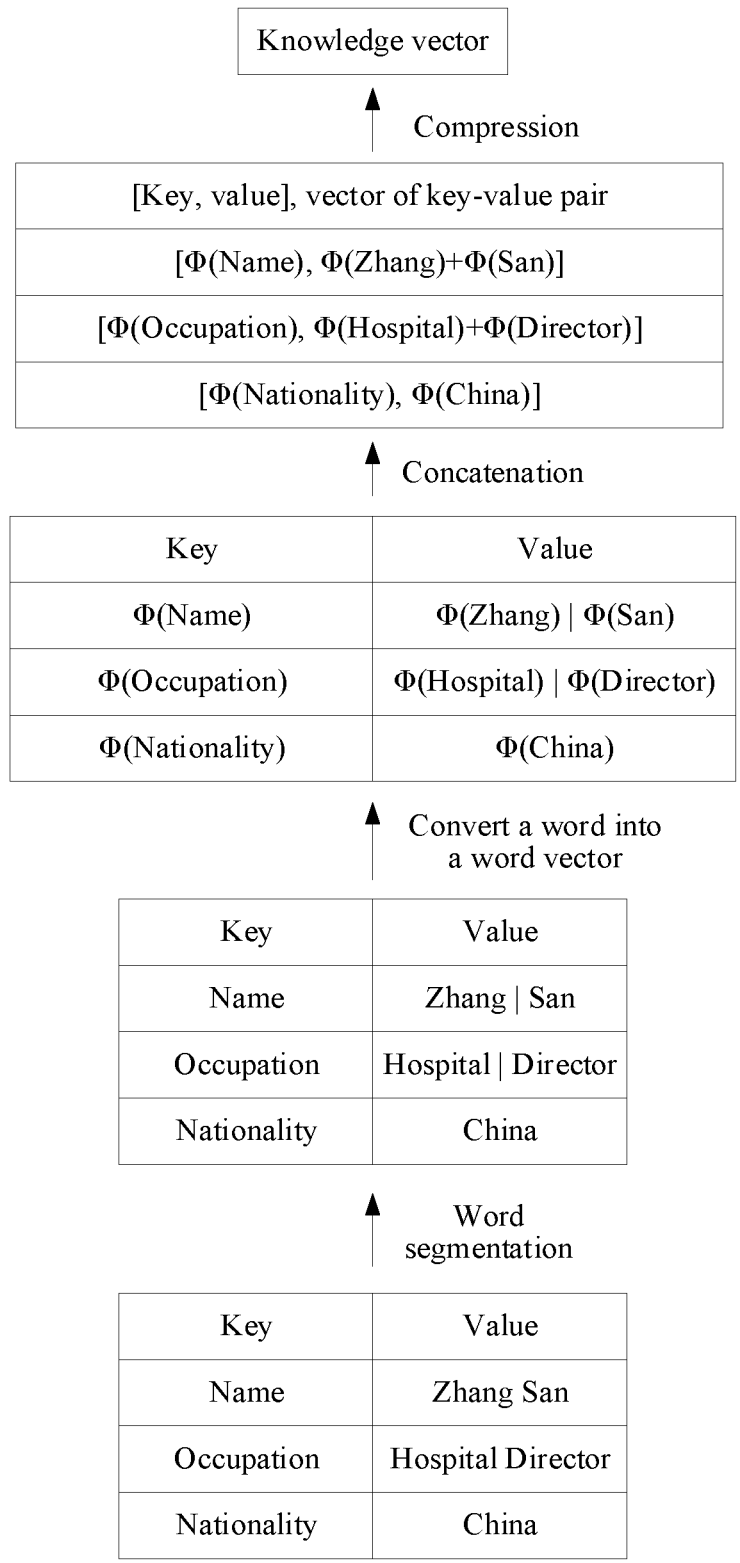
FIG. 11 is a schematic flowchart of obtaining a knowledge vector according to one or more embodiments of the present disclosure.

Based on the knowledge data shown in Table 1, a process of obtaining a knowledge vector of the knowledge data may be shown in FIG. 11. Word segmentation is separately performed on a key and a value in a key-value pair of each piece of knowledge data, and for each word, a word vector of the word is obtained, Φ representing the word vector. Word vectors of words in each key-value pair are combined into one vector in a concatenation manner, and then, vectors of the three key-value pairs are compressed to obtain the knowledge vector of the knowledge data.

702. Obtain, in a second memory layer, a third target sentence matrix of the original vector set according to the original vector set and the memory vector set.

The input layer inputs the original vector set and the memory vector set into a second memory layer, and obtains a third target sentence matrix in the second memory layer, the third target sentence matrix being configured to describe the target paragraph according to an association relationship between the original vector set and the memory vector set. A sentence with a relatively high similarity to the context sentence may be memory-enhanced, and more attention is paid to the sentence during subsequent processing, which is equivalent to applying an attention mechanism to obtain the third target sentence matrix, so that the third target sentence matrix describes the target paragraph more accurately.

Figure 7B:
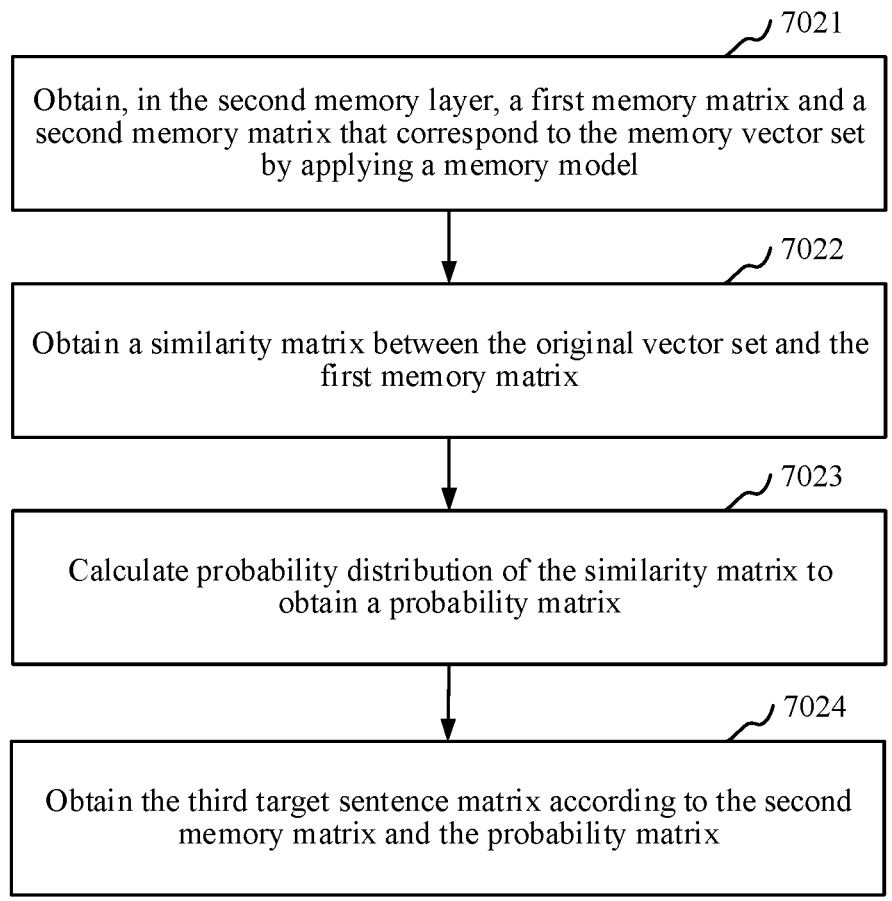
FIG. 7B is a schematic flowchart of obtaining, in a second memory layer, a third target sentence matrix of an original vector set according to one or more embodiments of the present disclosure.

In certain embodiments, as shown in FIG. 7B, step 702 may include the following steps 7021 to 7024:

7021. Obtain, in the second memory layer, a first memory matrix and a second memory matrix that correspond to the memory vector set by applying a memory model.

The second memory layer includes a memory model, and a first memory matrix and a second memory matrix that correspond to the memory vector set may be obtained by applying the memory model. The first memory matrix and the second memory matrix are configured to describe the memory vector set, and the first memory matrix and the second memory matrix may be the same or different.

For a manner of obtaining the first memory matrix, a word vector of each word in the context sentence may be obtained according to the memory vector set, a sentence vector of each sentence is obtained by applying the sentence encoding model, and the first memory matrix is obtained according to the sentence vector of the each sentence.

In certain embodiments, the sentence encoding model includes a third sentence encoding submodel and a fourth sentence encoding submodel, and a process of obtaining the sentence vector of the sentence may include: for each sentence in the context sentence, obtaining a word vector of each word in the sentence, to obtain a plurality of word vectors; performing forward-order encoding on the plurality of word vectors by applying the third sentence encoding submodel, to obtain a third vector, and performing reverse-order encoding on the plurality of word vectors by applying the fourth sentence encoding submodel, to obtain a fourth vector; and obtaining the sentence vector of the sentence according to the third vector and the fourth vector.

A specific process of obtaining the sentence vector is similar to the foregoing step 7011, and details are not described herein again.

After the sentence vector of the each sentence in the context sentence is obtained, the sentence vectors of the sentences are combined to obtain the first memory matrix.

In addition, a manner of obtaining the second memory matrix is similar to the manner of obtaining the first memory matrix, and the manner of obtaining the second memory matrix differs from the manner of obtaining the first memory matrix only in that a sentence encoding model used may be the same as or different from the sentence encoding model used when the first memory matrix is obtained.

Figure 12:
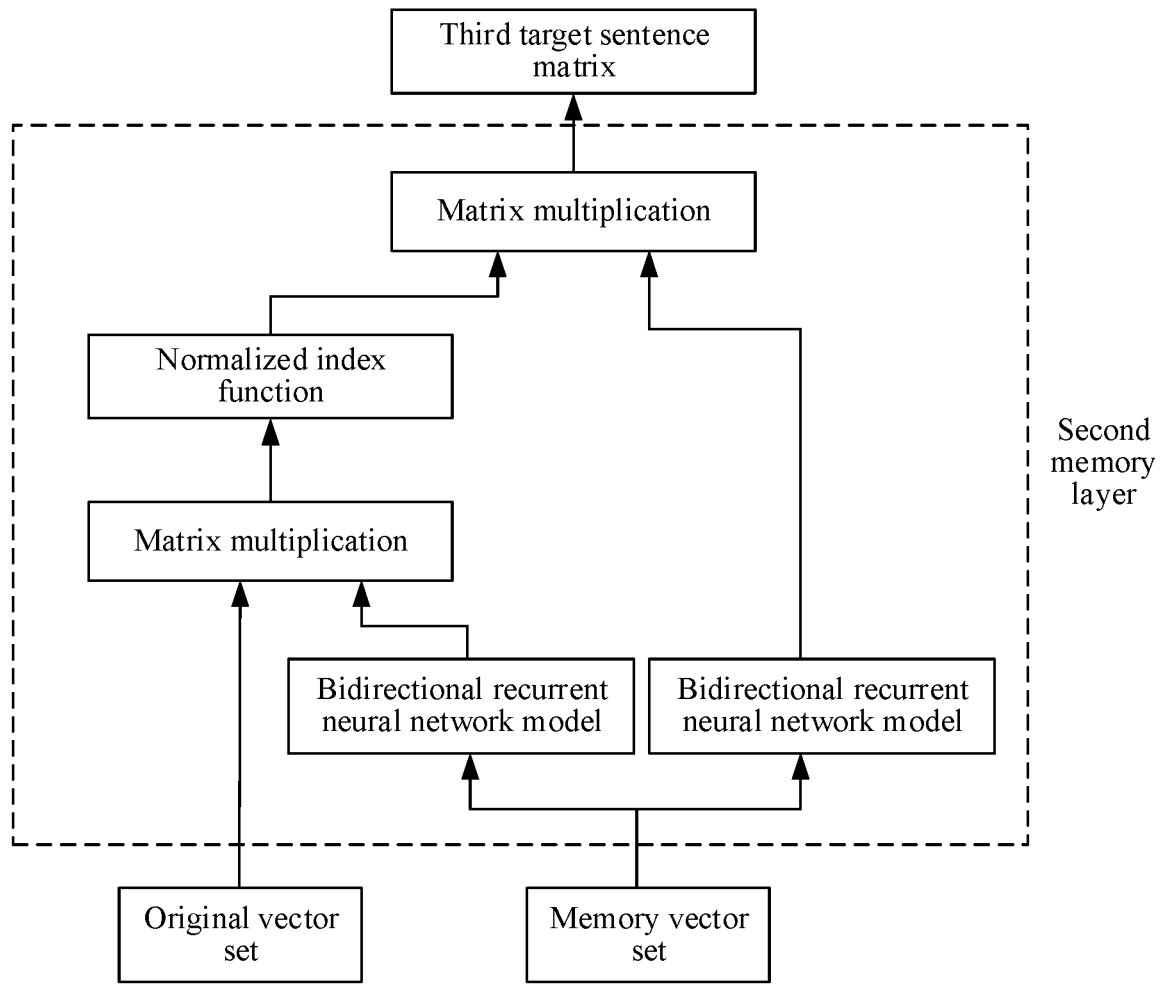
FIG. 12 is a schematic structural diagram of a memory layer according to one or more embodiments of the present disclosure.

Referring to FIG. 12, the sentence encoding models used when the first memory matrix and the second memory matrix are obtained are both bidirectional recurrent neural network models, and the two bidirectional recurrent neural network models are applied to processing the memory vector set separately to obtain the first memory matrix and the second memory matrix. Parameters of the two bidirectional recurrent neural network models may be the same or different. Therefore, the obtained first memory matrix and second memory matrix may be the same or different.

Since the first memory matrix and the second memory matrix can describe the memory vector set, in processing performed according to the first memory matrix, the second memory matrix, and the original vector set, an association relationship between the context sentence and the target paragraph can be considered, so that a paragraph of the target paragraph can be described more accurately.

In this embodiment of the present disclosure, an example in which the target paragraph and the context sentence are the same is used, and the original vector set and the memory vector set are the same. In this case, the following steps 7022 to 7024 may be performed to obtain the third target sentence matrix for describing the target paragraph. When the target paragraph is different from the context sentence, the third target sentence matrix may further be obtained in a plurality of manners.

7022. Obtain a similarity matrix between the original vector set and the first memory matrix.

A similarity matrix may be obtained in a plurality of manners, for example, matrix multiplication or matrix subtraction. In certain embodiments, sentence vectors in the original vector set are combined to obtain an original sentence matrix of the target paragraph, and the original sentence matrix is multiplied by the first memory matrix, to obtain a matrix as the similarity matrix. Alternatively, the original sentence matrix may be multiplied by a transpose of the first memory matrix to obtain a matrix as the similarity matrix.

Each value in the similarity matrix represents a similarity between a sentence in the original vector set and a corresponding sentence in the context sentence. A higher similarity indicates a closer association between the two sentences, and more attention is to be paid to the sentence during subsequent processing.

7023. Calculate probability distribution of the similarity matrix to obtain a probability matrix.

The similarity matrix includes a plurality of similarities. The probability distribution of the similarity matrix may be calculated to obtain a probability matrix. The probability matrix includes a probability corresponding to each similarity, and a sum of probabilities of all the similarities is 1.

The probability distribution may be calculated in a plurality of manners. In certain embodiments, a Softmax (normalized index) function is configured to calculate the similarity matrix to obtain the probability matrix corresponding to the similarity matrix. Alternatively, for each location in the similarity matrix, a ratio of a similarity at the location to a sum of all the similarities in the similarity matrix is obtained, to obtain a probability corresponding to the similarity at the location, thereby obtaining the probability corresponding to the similarity at the each location, and the obtained probabilities are combined into the probability matrix.

7024. Obtain the third target sentence matrix according to the second memory matrix and the probability matrix.

According to the second memory matrix and the probability matrix, a third target sentence matrix may be obtained in a plurality of manners. In certain embodiments, the probability matrix is multiplied by the second memory matrix to obtain the third target sentence matrix with the same size as the sentence matrix of the target paragraph.

A higher similarity between the sentence in the target paragraph and the context sentence indicates a greater probability. Therefore, by multiplying the probability matrix by the second memory matrix, a sentence having a relatively high similarity to the context sentence may be memory-enhanced.

For example, the original vector set includes sentence vectors of J sentences of the target paragraph, and the memory vector set includes word vectors of K words of the context sentence, J and K being positive integers. In this case, a matrix X corresponding to the original vector set is a J*D matrix, and a matrix M corresponding to the memory vector set is a K*D matrix, D being a quantity of dimensions of the sentence vector. The two matrices are inputted into the memory layer, and by performing the foregoing steps 7021 to 7023, and the obtained third target sentence matrix is O=Softmax(XΦ1)(M)T)Φ2(M), Φ1(M) being the first memory matrix, and Φ2(M) being the second memory matrix.

703. Perform, in a second gating layer, weighted summation on the original vector set and the third target sentence matrix, to obtain a fourth target sentence matrix, and make each value in the fourth target sentence matrix fall within a preset value range.

The input layer inputs the original vector set to the second gating layer, the second memory layer inputs the third target sentence matrix to the second gating layer, and in the second gating layer, processing is performed according to the original vector set and the third target sentence matrix. Proportions of the memory-enhanced third target sentence matrix and the original vector set are adjusted, to adjust a proportion of the sentence that is in the target paragraph and that has a relatively high similarity to the context sentence.

Figure 7C:
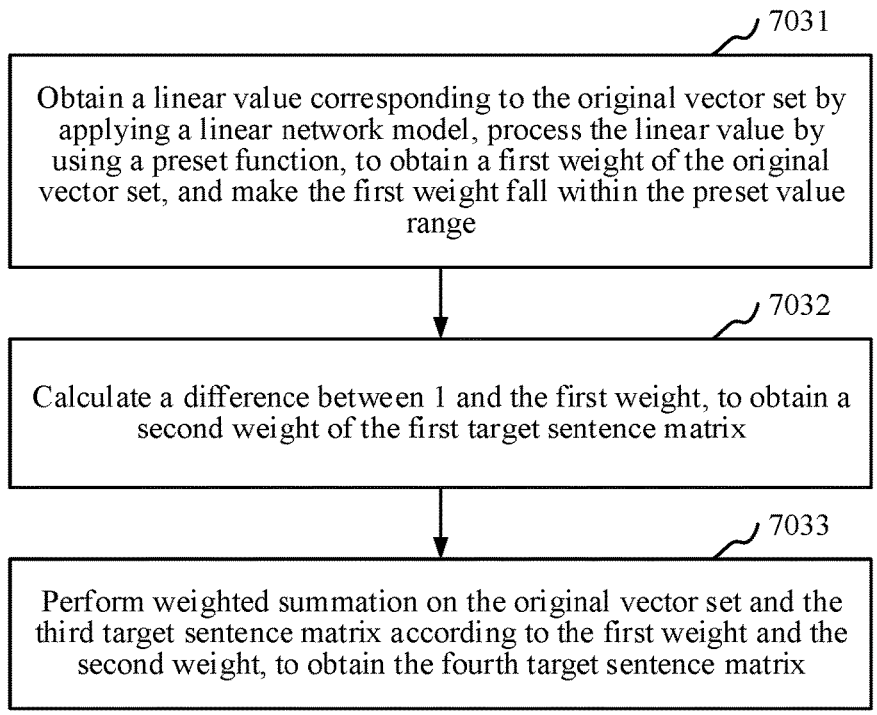
FIG. 7C is a schematic flowchart of obtaining, in a second gating layer, a fourth target sentence matrix according to one or more embodiments of the present disclosure.

In certain embodiments, as shown in FIG. 7C, step 703 may include the following steps 7031 to 7033:

7031. Obtain a linear value corresponding to the original vector set by applying a linear network model, process the linear value by using a preset function, to obtain a first weight of the original vector set, and make the first weight fall within the preset value range.

Figure 13:
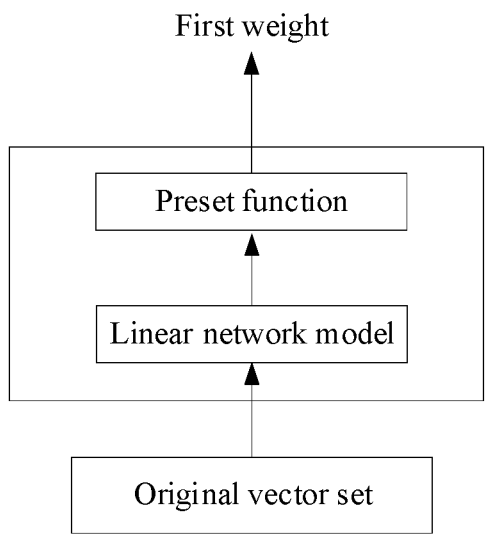
FIG. 13 is a schematic structural diagram of a gating layer according to one or more embodiments of the present disclosure.

Referring to FIG. 13, the linear network model may be a linear neural network model or another linear network model. After linear processing is performed on the original vector set, the obtained linear value can describe the original vector set.

After the linear value is obtained, the linear value is processed by using the preset function, to obtain the first weight of the original vector set. The preset function is configured to compress the linear value to a preset value range, to make the obtained first weight fall within the preset value range. The preset function may be a sigmoid (a non-linear function of a neuron) function or another function. The preset value range may be a value range from 0 to 1, and the first weight is greater than 0 and less than 1.

7032. Calculate a difference between 1 and the first weight, to obtain a second weight of the first target sentence matrix.

The first weight is a weight of the original vector set, and the second weight is a weight of the third target sentence matrix, a sum of the first weight and the second weight being 1. After the first weight is obtained, the second weight is obtained by calculating a difference between 1 and the first weight.

7033. Perform weighted summation on the original vector set and the third target sentence matrix according to the first weight and the second weight, to obtain the fourth target sentence matrix.

Figure 14:
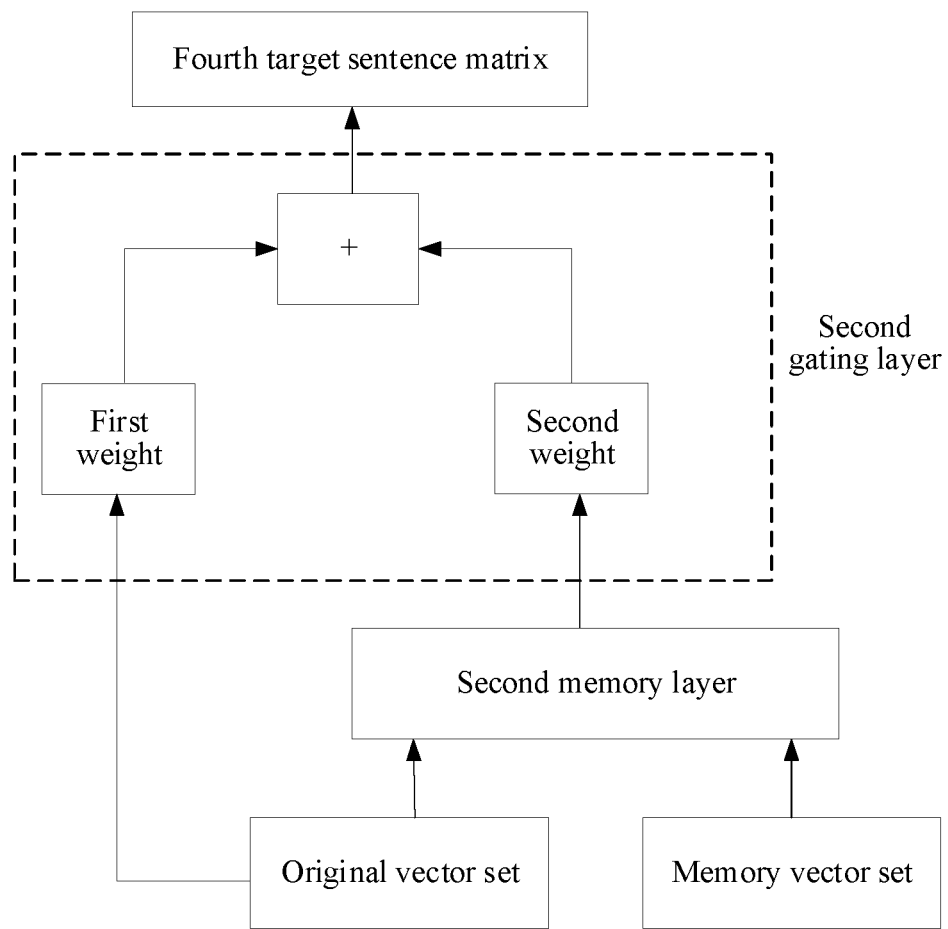
FIG. 14 is a schematic structural diagram of a memory encoding model according to one or more embodiments of the present disclosure.

Referring to FIG. 14, sentence vectors in the original vector set are combined to obtain an original sentence matrix of the target paragraph. The first weight is a weight of the original sentence matrix, and the second weight is a weight of the third target sentence matrix. Weighted summation is performed on the original sentence matrix and the third target sentence matrix according to the first weight and the second weight, to obtain a fourth target sentence matrix, and each value in the fourth target sentence matrix is made to fall within a preset value range.

In certain embodiments, weighted summation is performed by using the following formula:

$$O'=G*X+(1-G)*O$$

where O' is the fourth target sentence matrix, G is the first weight, X is the original sentence matrix of the target paragraph, and O is the third target sentence matrix.

The second gating layer may filter information that is learned of after memory enhancing, adjust a proportion between the target paragraph and the context sentence, control flowing of the information, and avoid adding too much information that is not related to the target paragraph.

704. Obtain, in a first memory layer, a first target sentence matrix of the original vector set according to the fourth target sentence matrix and the knowledge vector set.

The input layer inputs the knowledge vector set into the first memory layer, and the second gating layer inputs the fourth target sentence matrix into the first memory layer. In the first memory layer, a first target sentence matrix of the original vector set is obtained according to the fourth target sentence matrix and the knowledge vector set.

The first target sentence matrix is configured to describe the target paragraph according to the fourth target sentence matrix with reference to the knowledge vector set. External knowledge data may be introduced, related knowledge data is extracted from the external knowledge data, and the target paragraph is reinforced according to the extracted related knowledge data, so that the first target sentence matrix describes the target paragraph more accurately.

Figure 7D:
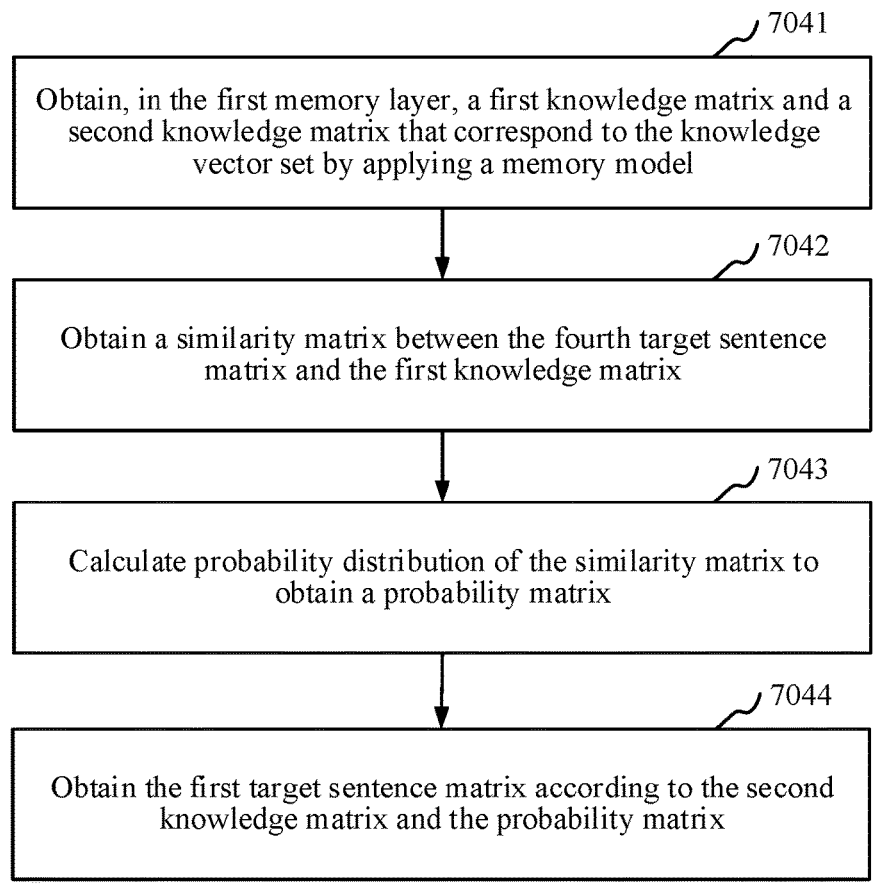
FIG. 7D is a schematic flowchart of obtaining, in a first memory layer, a first target sentence matrix of an original vector set according to one or more embodiments of the present disclosure.

In certain embodiments, as shown in FIG. 7D, step 704 may include the following steps 7041 to 7044:

7041. Obtain, in the first memory layer, a first knowledge matrix and a second knowledge matrix that correspond to the knowledge vector set by applying a memory model.

The first memory layer includes a memory model, and a first knowledge matrix and a second knowledge matrix that correspond to the knowledge vector set may be obtained by applying the memory model. The first knowledge matrix and the second knowledge matrix are configured to describe the knowledge vector set, and the first knowledge matrix and the second knowledge matrix may be the same or different.

For a manner of obtaining the first knowledge matrix, a knowledge vector of each piece of knowledge data in the preset database may be obtained according to the knowledge vector set, a first knowledge vector of the each piece of knowledge data is obtained by applying a sentence encoding model, and the first knowledge matrix is obtained according to the first knowledge vector of the each piece of knowledge data.

In certain embodiments, the sentence encoding model includes a fifth sentence encoding submodel and a sixth sentence encoding submodel, and a process of obtaining the knowledge vector of the knowledge data may include: for each piece of knowledge data in the preset database, obtaining a knowledge vector of the each piece of knowledge data, to obtain at least one knowledge vector; performing forward-order encoding the at least one knowledge vector by applying the fifth sentence encoding submodel, to obtain a fifth vector of each knowledge vector, and performing reverse-order encoding on the at least one knowledge vector by applying the sixth sentence encoding submodel, to obtain a sixth vector of the each knowledge vector; and obtaining the first knowledge vector of the knowledge data according to the fifth vector and the sixth vector. After the first knowledge vector of the knowledge data is obtained, first knowledge vectors of the pieces of knowledge data are combined to obtain the first knowledge matrix.

In addition, a manner of obtaining the second knowledge matrix is similar to the manner of obtaining the first knowledge matrix, and the manner of obtaining the second knowledge matrix differs from the manner of obtaining the first knowledge matrix only in that a sentence encoding model used may be the same as or different from the sentence encoding model used when the first knowledge matrix is obtained.

In certain embodiments, the sentence encoding models used when the first knowledge matrix and the second knowledge matrix are obtained are both bidirectional recurrent neural network models, and the two bidirectional recurrent neural network models are applied to processing the knowledge vector set separately to obtain the first knowledge matrix and the second knowledge matrix. Parameters of the two bidirectional recurrent neural network models may be the same or different. Therefore, the obtained first knowledge matrix and second knowledge matrix may be the same or different.

Since the first knowledge matrix and the second knowledge matrix can describe the knowledge vector set, in processing performed according to the first knowledge matrix, the second knowledge matrix, and the fourth target sentence matrix, external knowledge data can be introduced, related knowledge data is extracted from the external knowledge data, and the target paragraph is reinforced based on the extracted related knowledge data, to obtain a paragraph vector that can more accurately describe the target paragraph.

7042. Obtain a similarity matrix between the fourth target sentence matrix and the first knowledge matrix.

There are a plurality of manners of obtaining the similarity matrix, for example, matrix multiplication or matrix subtraction. In certain embodiments, the fourth target sentence matrix is multiplied by the first knowledge matrix, to obtain a matrix as the similarity matrix. Alternatively, the fourth target sentence matrix may be multiplied by a transpose of the first knowledge matrix to obtain a matrix as the similarity matrix.

Each value in the similarity matrix represents a similarity between a sentence in the original vector set and knowledge data in the preset database. A higher similarity indicates a closer association, and more related knowledge data in the knowledge data is to be introduced during subsequent processing, to reinforce the sentence in the target paragraph.

7043. Calculate probability distribution of the similarity matrix to obtain a probability matrix.

The similarity matrix includes a plurality of similarities. The probability distribution of the similarity matrix may be calculated to obtain a probability matrix. The probability matrix includes a probability corresponding to each similarity, and a sum of probabilities of all the similarities is 1.

The probability distribution may be calculated in a plurality of manners. In certain embodiments, a Softmax (normalized index) function is configured to calculate the similarity matrix to obtain the probability matrix corresponding to the similarity matrix. Alternatively, for each location in the similarity matrix, a ratio of a similarity at the location to a sum of all the similarities in the similarity matrix is obtained, to obtain a probability corresponding to the similarity at the location, thereby obtaining the probability corresponding to the similarity at the each location, and the obtained probabilities are combined into the probability matrix.

7044. Obtain the first target sentence matrix according to the second knowledge matrix and the probability matrix.

According to the second knowledge matrix and the probability matrix, a first target sentence matrix may be obtained in a plurality of manners. In certain embodiments, the probability matrix is multiplied by the second knowledge matrix to obtain the first target sentence matrix with the same size as the fourth target sentence matrix.

Compared with the fourth target sentence matrix, the first target sentence matrix extracts knowledge data related to the original vector set from the knowledge vector set, to describe the target paragraph more accurately. A higher similarity between a vector in the fourth target sentence matrix and a vector in the first knowledge matrix indicates a greater probability. Therefore, by multiplying the probability matrix by the second knowledge matrix, related knowledge data in the knowledge data may be introduced to reinforce the sentence in the target paragraph, so that the first target sentence matrix describes the target paragraph more accurately.

705. Perform, in a first gating layer, weighted summation on the fourth target sentence matrix and the first target sentence matrix, to obtain a second target sentence matrix, and make each value in the second target sentence matrix fall within the preset value range.

The second gating layer inputs the fourth target sentence matrix to the first gating layer, the first memory layer inputs the first target sentence matrix to the first gating layer, and in the first gating layer, proportions of the fourth target sentence matrix to the first target sentence matrix are adjusted, to adjust proportions of the memory-enhanced target paragraph and the knowledge data.

Figure 7E:
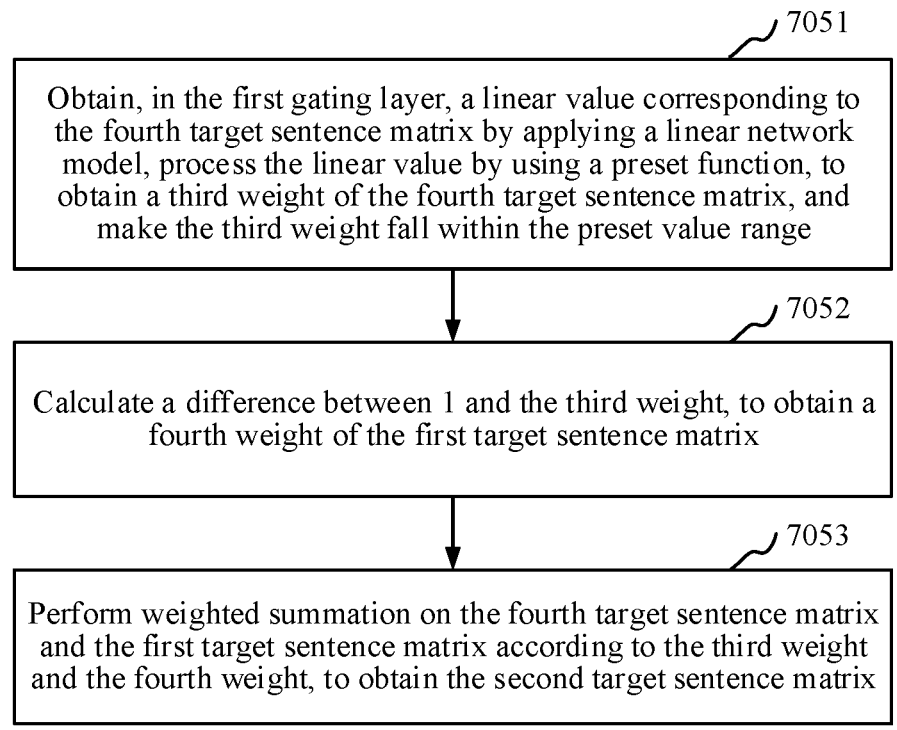
FIG. 7E is a schematic flowchart of obtaining, in a first gating layer, a second target sentence matrix according to one or more embodiments of the present disclosure.

In certain embodiments, as shown in FIG. 7E, step 705 may include the following steps 7051 to 7053:

7051. Obtain, in the first gating layer, a linear value corresponding to the fourth target sentence matrix by applying a linear network model, process the linear value by using a preset function, to obtain a third weight of the fourth target sentence matrix, and make the third weight fall within the preset value range.

In the first gating layer, a linear value corresponding to the fourth target sentence matrix is obtained by applying a linear network model. The linear network model may be a linear neural network model or another linear network model. Linear processing is performed on the fourth target sentence matrix, to obtain a linear value that can describe the fourth target sentence matrix.

After the linear value is obtained, the linear value is processed by using the preset function, to obtain a third weight of the fourth target sentence matrix. The preset function is configured to compress the linear value to a preset value range, to make the obtained third weight fall within the preset value range. The preset function may be a sigmoid (a non-linear function of a neuron) function or another function. The preset value range may be a value range from 0 to 1, and the third weight is greater than 0 and less than 1.

7052. Calculate a difference between 1 and the third weight, to obtain a fourth weight of the first target sentence matrix.

The third weight is a weight of the fourth target sentence matrix, and the fourth weight is a weight of the first target sentence matrix, a sum of the third weight and the fourth weight being 1. After the third weight is obtained, the fourth weight is obtained by calculating a difference between 1 and the third weight.

7053. Perform weighted summation on the fourth target sentence matrix and the first target sentence matrix according to the third weight and the fourth weight, to obtain the second target sentence matrix.

The third weight is a weight of the fourth target sentence matrix, and the fourth weight is a weight of the first target sentence matrix. According to the third weight and the fourth weight, weighted summation is performed on the fourth target sentence matrix and the first target sentence matrix to obtain the second target sentence matrix, and each value in the second target sentence matrix is made to fall within the preset value range.

In certain embodiments, weighted summation is performed by using the following formula:

$$O'=G*X+(1-G)*O$$

where O' is the second target sentence matrix, G is the third weight, X is the fourth target sentence matrix, and O is the first target sentence matrix.

The first gating layer may filter information that is learned of after the related knowledge data is introduced, adjust a proportion between the memory-enhanced target paragraph and the target paragraph to which the related knowledge data is introduced, control flowing of the information, and avoid adding too much information that is not related to the target paragraph.

706. Obtain, in an output layer, a paragraph vector of the target paragraph according to the second target sentence matrix.

In the output layer, the second target sentence matrix is converted into a vector as a paragraph vector of the target paragraph. The paragraph vector may be obtained in a plurality of manners. In certain embodiments, column summation is performed on the second target sentence matrix, that is, the second target sentence matrix is divided into a plurality of column vectors, and a sum of values in each column vector is calculated, to obtain a total value of the each column vector, and the total values of the plurality of column vectors are combined into one vector, to obtain the paragraph vector.

Figure 15:
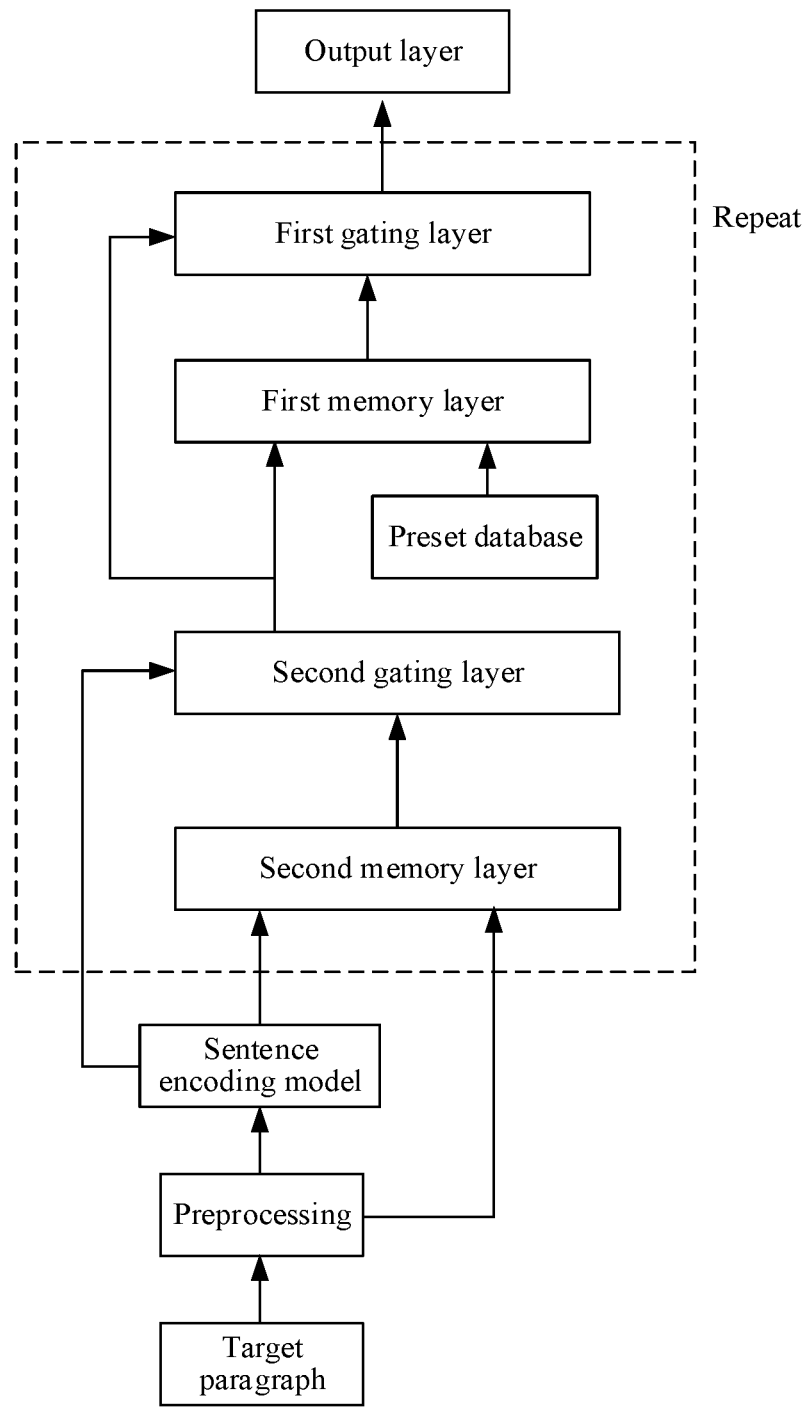
FIG. 15 is a schematic structural diagram of a memory encoding model according to one or more embodiments of the present disclosure.

In this embodiment of the present disclosure, description is made only by using an example in which the second memory layer, the second gating layer, the first memory layer, and the first gating layer are run once, and in another embodiment, the second memory layer, the second gating layer, the first memory layer, and the first gating layer may alternatively be run repeatedly, as shown in FIG. 15. To be specific, after the second target sentence matrix is obtained in the first gating layer, the second target sentence matrix is used as an updated original vector set and the memory vector set, the knowledge vector set is kept unchanged, or the knowledge vector set may be updated to obtain an updated knowledge vector set, the second memory layer, the second gating layer, the first memory layer, and the first gating layer repeatedly perform the step of obtaining a target sentence matrix according to the updated original vector set, memory vector set, and knowledge vector set until a quantity of repetitions reaches a preset quantity of times, a current target sentence matrix is inputted into the output layer, and the paragraph vector of the target paragraph is obtained according to the current target sentence matrix in the output layer. The preset quantity of times may be determined as required or may be a value determined experimentally, and the preset quantity of times may be 2, 3, or the like.

In certain embodiments, the second memory layer and the second gating layer may be repeatedly run, that is, after the fourth target sentence matrix is obtained in the second gating layer, the fourth target sentence matrix is used as an updated original vector set and the memory vector set, the second memory layer and the second gating layer repeatedly perform the step of obtaining a target sentence matrix according to the updated original vector set and the memory vector set until a quantity of repetitions reaches the preset quantity of times, and a current target sentence matrix is inputted into the first memory layer. In a subsequent process, processing is continued in the first memory layer and the first gating layer.

In certain embodiments, the first memory layer and the first gating layer may be repeatedly run, after the second target sentence matrix is obtained in the first gating layer, the second target sentence matrix is used as an updated fourth target sentence matrix, the knowledge vector set is kept unchanged, or the knowledge vector set may be updated to obtain an updated knowledge vector set, the first memory layer and the first gating layer repeatedly perform the step of obtaining a target sentence matrix according to the updated fourth target sentence matrix and knowledge vector set until a quantity of repetitions reaches the preset quantity of times, and a current target sentence matrix is inputted into the output layer. The output layer obtains the paragraph vector of the target paragraph according to the current target sentence matrix.

707. Perform processing based on the paragraph vector.

After the paragraph vector for the target paragraph is obtained, the paragraph vector is processed. A manner of processing the paragraph vector varies with different implementation scenarios, and a specific processing manner may be determined according to requirements. For example, in a scenario of an intelligent dialog, the target paragraph is a text message inputted by a user. After the paragraph vector of the target paragraph is obtained, a matching reply message is obtained according to the paragraph vector, so that a reply meeting the requirements of the user can be provided for the text message inputted by the user.

According to the encoding method provided in the embodiments of the present disclosure, a memory encoding model is provided, including an input layer, a first memory layer, and an output layer. A target paragraph and a preset database are obtained, the target paragraph and the preset database are inputted into the memory encoding model, and the input layer obtains an original vector set of the target paragraph and a knowledge vector set of the preset database; the first memory layer obtains a first target sentence matrix of the original vector set according to the original vector set and the knowledge vector set; and the output layer obtains a paragraph vector of the target paragraph according to the first target sentence matrix, and performs processing based on the paragraph vector. According to the embodiments of the present disclosure, each sentence does not need to be separately encoded in a serial manner, and instead, the memory encoding model is applied to encoding the target paragraph by using the target paragraph as a unit, thereby improving an encoding speed. Moreover, both the target paragraph and the knowledge data in the preset database are considered in the encoding process, so that not only the obtained paragraph vector can express a meaning of the target paragraph, but also related knowledge data can be extracted from external knowledge data, thereby improving encoding accuracy.

The memory encoding model provided in the embodiments of the present disclosure has self-attention. The self-attention mechanism is applied to a sentence level of a paragraph, and comprehensive processing is performed according to the target paragraph, the context sentence, and the knowledge data in the preset database, to ensure a richer expression of the paragraph vector of the target paragraph, thereby more accurately describing the meaning of the target paragraph. In addition, the embodiments of the present disclosure may be applied to a plurality of scenarios and have a wide implementation range.

In the embodiments of the present disclosure, description is made only by using an example in which the memory encoding model includes a second memory layer, a second gating layer, a first memory layer, and a first gating layer. In certain embodiments, the memory encoding model may alternatively have another network architecture.

In certain embodiments, the memory encoding model includes an input layer, a first memory layer, and an output layer.

The input layer inputs an original vector set and a knowledge vector set into the first memory layer, and the first memory layer obtains a first target sentence matrix according to the original vector set and the knowledge vector set, and inputs the first target sentence matrix into the output layer. The output layer obtains a paragraph vector of a target paragraph according to the first target sentence matrix.

In certain embodiments, the memory encoding model includes an input layer, a first memory layer, a first gating layer, and an output layer.

The input layer inputs the original vector set and the knowledge vector set into the first memory layer, and the first memory layer obtains the first target sentence matrix according to the original vector set and the knowledge vector set, and inputs the first target sentence matrix to the first gating layer. The first gating layer obtains a second target sentence matrix according to the original vector set and the first target sentence matrix, and inputs the second target sentence matrix into the output layer. The output layer obtains the paragraph vector of the target paragraph according to the second target sentence matrix.

In certain embodiments, the memory encoding model includes an input layer, a second memory layer, a first memory layer, and an output layer.

The input layer inputs the original vector set and a memory vector set into the second memory layer. The second memory layer obtains a third target sentence matrix according to the original vector set and the memory vector set that are inputted, and inputs the third target sentence matrix into the first memory layer, and the input layer inputs the knowledge vector set to the first memory layer. The first memory layer obtains the first target sentence matrix according to the inputted third target sentence matrix and knowledge vector set, and inputs the first target sentence matrix into the output layer, and the output layer obtains the paragraph vector of the target paragraph according to the first target sentence matrix.

In certain embodiments, the memory encoding model includes an input layer, a second memory layer, a second gating layer, a first memory layer, and an output layer.

The input layer inputs the original vector set and the memory vector set into the second memory layer, and also inputs the knowledge vector set into the first memory layer. The second memory layer obtains the third target sentence matrix according to the original vector set and the memory vector set that are inputted, and inputs the third target sentence matrix into the second gating layer. The second gating layer performs weighted summation on the original vector set and the third target sentence matrix, to obtain a fourth target sentence matrix, and inputs the fourth target sentence matrix into the first memory layer. The first memory layer obtains the first target sentence matrix according to the fourth target sentence matrix and the knowledge vector set, and inputs the first target sentence matrix into the output layer, and the output layer obtains the paragraph vector of the target paragraph according to the first target sentence matrix.

In certain embodiments, the memory encoding model includes an input layer, a first memory layer, a third memory layer, and an output layer.

The input layer inputs the original vector set and the knowledge vector set into the first memory layer, and inputs the memory vector set into the third memory layer. The first memory layer obtains the first target sentence matrix according to the original vector set and the knowledge vector set and inputs the first target sentence matrix to the third memory layer, the third memory layer obtains a fifth target sentence matrix according to the memory vector set and the first target sentence matrix, and inputs the fifth target sentence matrix into the output layer, and the output layer obtains the paragraph vector of the target paragraph according to the fifth target sentence matrix.

In certain embodiments, the memory encoding model includes an input layer, a first memory layer, a third memory layer, a third gating layer, and an output layer.

Figure 16:
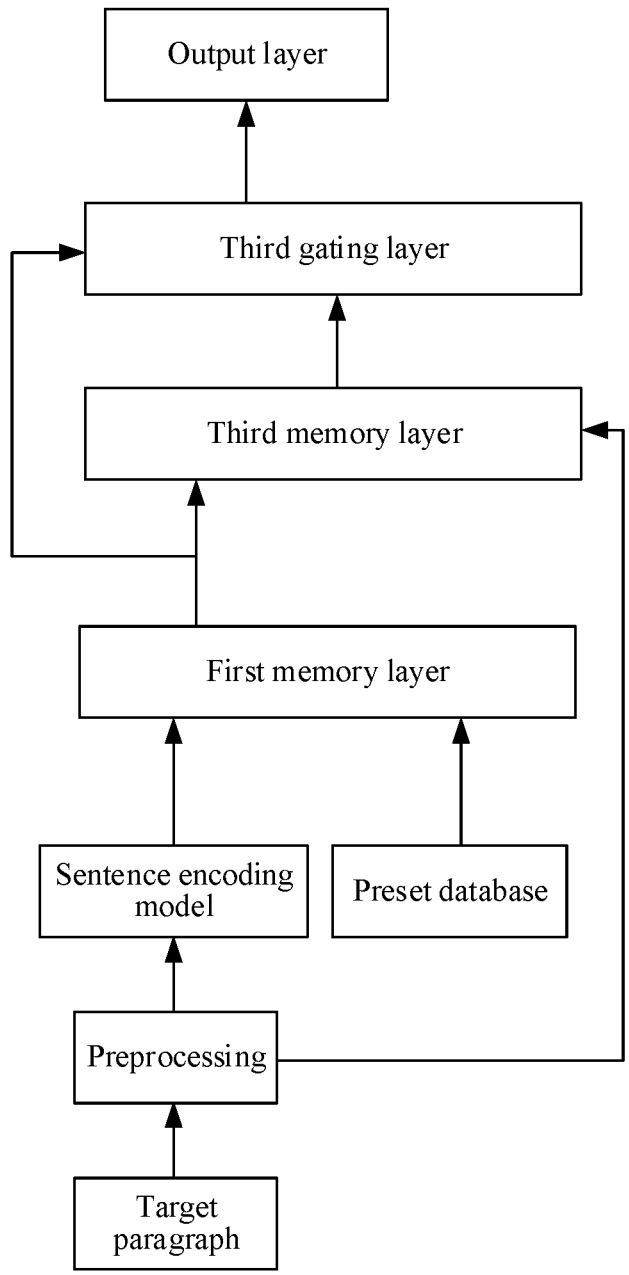
FIG. 16 is a schematic structural diagram of a memory encoding model according to one or more embodiments of the present disclosure.

As shown in FIG. 16, the input layer inputs the original vector set and the knowledge vector set into the first memory layer, and inputs the memory vector set into the third memory layer. The first memory layer obtains the first target sentence matrix according to the original vector set and the knowledge vector set, and inputs the first target sentence matrix into the third memory layer, the third memory layer obtains the fifth target sentence matrix according to the memory vector set and the first target sentence matrix, and inputs the fifth target sentence matrix into the third gating layer, the third gating layer performs weighted summation on the fifth target sentence matrix and the first target sentence matrix to obtain a sixth target sentence matrix, and inputs the sixth target sentence matrix into the output layer, and the output layer obtains the paragraph vector of the target paragraph according to the sixth target sentence matrix.

The embodiments of the present disclosure provide a network architecture of a memory encoding model, and the target paragraph may be encoded by applying the memory encoding model. In addition, the encoding method provided in the foregoing embodiments is not only applicable to an encoding process, but also applicable to a process of training the memory encoding model.

That is, in certain embodiments, in the process of training the memory encoding model, an initialized memory encoding model is obtained, or a memory encoding model that has been trained one or more times but has accuracy that does not meet the requirements is obtained. Moreover, one or more sample paragraphs are obtained as target paragraphs. A current memory encoding model is applied to processing the target paragraph, and a paragraph vector of the target paragraph may be obtained by performing the encoding method provided in the foregoing embodiments during processing.

Subsequently, the paragraph vector of the target paragraph is decoded to obtain a test paragraph corresponding to the paragraph vector, and a model parameter in the memory encoding model is corrected according to an error between the target paragraph and the test paragraph. There may be a plurality of decoding manners. For example, the paragraph vector may be decoded by using a decoding algorithm, or the paragraph vector may be decoded by applying a decoding model. The decoding model may be a recurrent neural network model, a deep learning network model, a convolutional neural network model, or the like.

After training is performed one or more times in the foregoing manner, the model parameter in the memory encoding model can be determined, to obtain a memory encoding model of which accuracy meets the requirements.

In another possible implementation, the memory encoding model has been trained, and accuracy of the memory encoding model meets the requirements. The memory encoding model is obtained, and when a specific target paragraph is to be encoded, the memory encoding model is applied to processing the target paragraph, and a paragraph vector of the target paragraph may be obtained by performing the encoding method provided in the foregoing embodiments during processing. The memory encoding model may be trained by using an encoding device, or sent to an encoding device after being trained by a training device, and the training device may alternatively be a terminal or a server.

Figure 17:
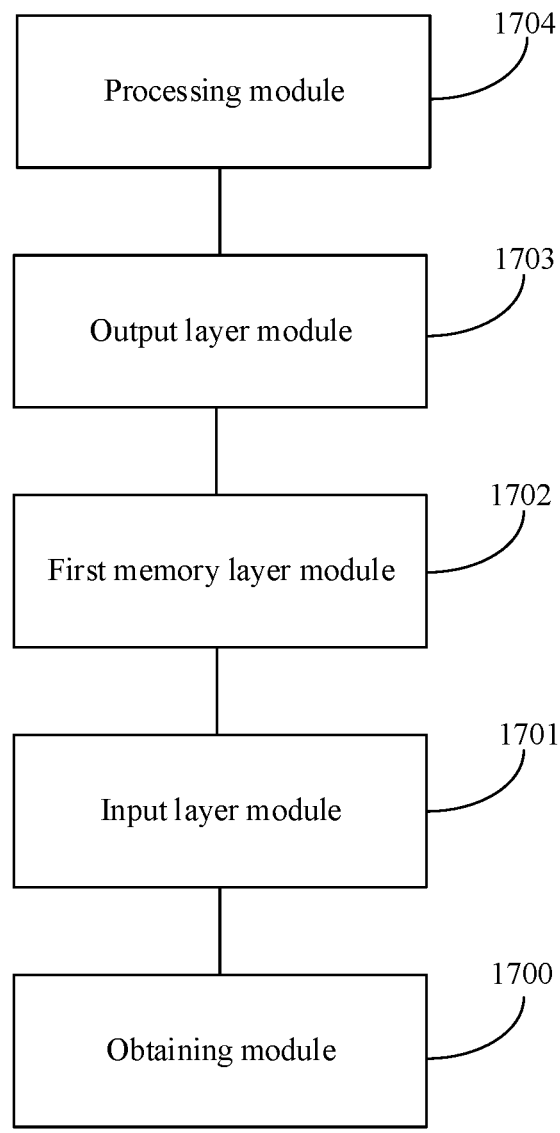
FIG. 17 is a schematic structural diagram of an encoding apparatus according to one or more embodiments of the present disclosure.

FIG. 17 is a schematic structural diagram of an encoding apparatus according to an embodiment of the present disclosure. Referring to FIG. 17, the apparatus includes an obtaining module 1700, an input layer module 1701, a first memory layer model 1702, an output layer module 1703, and a processing module 1704.

The obtaining module 1700 is configured to obtain a target paragraph and a preset database, and input the target paragraph and the preset database into a memory encoding model, the target paragraph including at least one sentence.

The input layer module 1701 is configured to obtain an original vector set of the target paragraph and a knowledge vector set of the preset database, the original vector set including a sentence vector of each sentence in the target paragraph, and the knowledge vector set including knowledge vectors of a plurality of pieces of knowledge data in the preset database.

The first memory layer model 1702 is configured to obtain a first target sentence matrix of the original vector set according to the original vector set and the knowledge vector set, the first target sentence matrix being configured to describe the target paragraph according to an association relationship between the original vector set and the knowledge vector set.

The output layer module 1703 is configured to obtain a paragraph vector of the target paragraph according to the first target sentence matrix.

The processing module 1704 is configured to perform processing based on the paragraph vector.

According to the encoding apparatus provided in the embodiments of the present disclosure, the obtaining module obtains a target paragraph and a preset database, and inputs the target paragraph and the preset database into a memory encoding model, the input layer module obtains an original vector set of the target paragraph and a memory vector set of a context sentence of the target paragraph, the memory layer module obtains a first target sentence matrix of the original vector set according to the original vector set and the memory vector set, the output layer module obtains a paragraph vector of the target paragraph according to the first target sentence matrix, and the processing module performs processing based on the paragraph vector. According to the embodiments of the present disclosure, each sentence does not need to be separately encoded in a serial manner, and instead, the memory encoding model is applied to encoding the target paragraph by using the target paragraph as a unit, thereby improving an encoding speed. Moreover, the target paragraph, the knowledge data in the preset database, and the context sentence of the target paragraph are all considered in the encoding process, so that not only the obtained paragraph vector can express a meaning of the target paragraph, but also related knowledge data can be extracted from external knowledge data, thereby improving encoding accuracy.

The memory encoding model provided in the embodiments of the present disclosure has self-attention. The self-attention mechanism is applied to a sentence level of a paragraph, and comprehensive processing is performed according to the target paragraph and the context sentence, to ensure a richer expression of the paragraph vector of the target paragraph, thereby more accurately describing the meaning of the target paragraph. In addition, the embodiments of the present disclosure may be applied to a plurality of scenarios and have a wide implementation range.

In certain embodiments, the input layer module 1701 includes: an original obtaining unit, configured to obtain, according to a word vector of each word in the each sentence in the target paragraph, a sentence vector of the each sentence by applying a sentence encoding model, to obtain the original vector set; and a knowledge obtaining unit, configured to obtain the knowledge vector set according to a knowledge vector of each piece of knowledge data in the preset database.

In certain embodiments, the apparatus further includes: a knowledge data obtaining module, configured to obtain each piece of knowledge data in the preset database; a knowledge vector obtaining module, configured to perform, for the each piece of knowledge data, word segmentation on the knowledge data to obtain at least one word, obtain a word vector of the at least one word, and obtain a knowledge vector of the knowledge data according to the word vector of the at least one word; and a storage module, configured to correspondingly store the knowledge vector and the knowledge data in the preset database.

In certain embodiments, the first memory layer model 1702 includes: a knowledge matrix obtaining unit, configured to obtain, by applying a first memory model, a first knowledge matrix and a second knowledge matrix that correspond to the knowledge vector set; and a first target obtaining unit, configured to obtain the first target sentence matrix of the original vector set according to the original vector set, the first knowledge matrix, and the second knowledge matrix.

In certain embodiments, the apparatus further includes a first gating layer module.

The first gating layer module is configured to perform weighted summation on the original vector set and the first target sentence matrix, to obtain a second target sentence matrix, and make each value in the second target sentence matrix fall within a preset value range.

The output layer module 1703 is configured to obtain the paragraph vector of the target paragraph according to the second target sentence matrix.

In certain embodiments, the first gating layer module further includes: a first weight obtaining unit, configured to obtain a linear value corresponding to the original vector set by applying a linear network model, process the linear value by using a preset function, to obtain a first weight of the original vector set, and make the first weight fall within the preset value range; a second weight obtaining unit, configured to calculate a difference between 1 and the first weight, to obtain a second weight of the first target sentence matrix; and a weighting unit, configured to perform weighted summation on the original vector set and the first target sentence matrix according to the first weight and the second weight, to obtain a second target sentence matrix.

In certain embodiments, the output layer module 1703 includes: a column summation unit, configured to perform column summation on the first target sentence matrix to obtain the paragraph vector.

In certain embodiments, the first memory layer model 1702 is further configured to use the first target sentence matrix as an updated original vector set and the knowledge vector set, repeatedly perform the step of obtaining a target sentence matrix according to the updated original vector set and the knowledge vector set until a quantity of repetitions reaches a preset quantity of times, and trigger the output layer module 1703.

The output layer module 1703 is further configured to obtain the paragraph vector of the target paragraph according to a current target sentence matrix.

In certain embodiments, the apparatus further includes a second memory layer module.

The input layer module 1701 is further configured to obtain a memory vector set of the target paragraph, the memory vector set including the word vector of the each word in the context sentence of the target paragraph.

The second memory layer module is configured to obtain a third target sentence matrix of the original vector set according to the original vector set and the memory vector set, the third target sentence matrix being configured to describe the target paragraph according to an association relationship between the original vector set and the memory vector set.

The first memory layer model 1702 is further configured to obtain the first target sentence matrix of the original vector set according to the third target sentence matrix and the knowledge vector set.

In certain embodiments, the apparatus further includes a second gating layer module.

The second gating layer module is configured to perform weighted summation on the original vector set and the third target sentence matrix, to obtain a fourth target sentence matrix, and make each value in the fourth target sentence matrix fall within the preset value range.

The first memory layer model is further configured to obtain the first target sentence matrix of the original vector set according to the fourth target sentence matrix and the knowledge vector set.

In certain embodiments, the apparatus further includes a third memory layer module.

The input layer module 1701 is further configured to obtain a memory vector set of the target paragraph, the memory vector set including the word vector of the each word in the context sentence of the target paragraph.

The third memory layer model is configured to obtain a fifth target sentence matrix of the original vector set according to the first target sentence matrix and the memory vector set, the fifth target sentence matrix being configured to describe the target paragraph according to an association relationship among the original vector set, the knowledge vector set, and the memory vector set.

The output layer module 1703 is further configured to obtain the paragraph vector of the target paragraph according to the fifth target sentence matrix.

In certain embodiments, the apparatus further includes a third gating layer module.

The third gating layer module is configured to perform weighted summation on the first target sentence matrix and the fifth target sentence matrix, to obtain a sixth target sentence matrix, and make each value in the sixth target sentence matrix fall within the preset value range.

The output layer module 1703 is further configured to obtain the paragraph vector of the target paragraph according to the sixth target sentence matrix.

When the encoding apparatus provided in the foregoing embodiment performs encoding on a paragraph, only division of the foregoing functional modules is described by using an example. During actual implementation, the foregoing functions may be allocated to and performed by different functional modules according to requirements, that is, the internal structure of the encoding device is divided into different functional modules, to perform all or some of the foregoing described functions. Moreover, the embodiments of the encoding apparatus provided in the foregoing embodiments belong to the same concept as that of the embodiments of the encoding method. For details of a specific implementation process thereof, refer to the method embodiments. Details are not described herein again.

Figure 18:
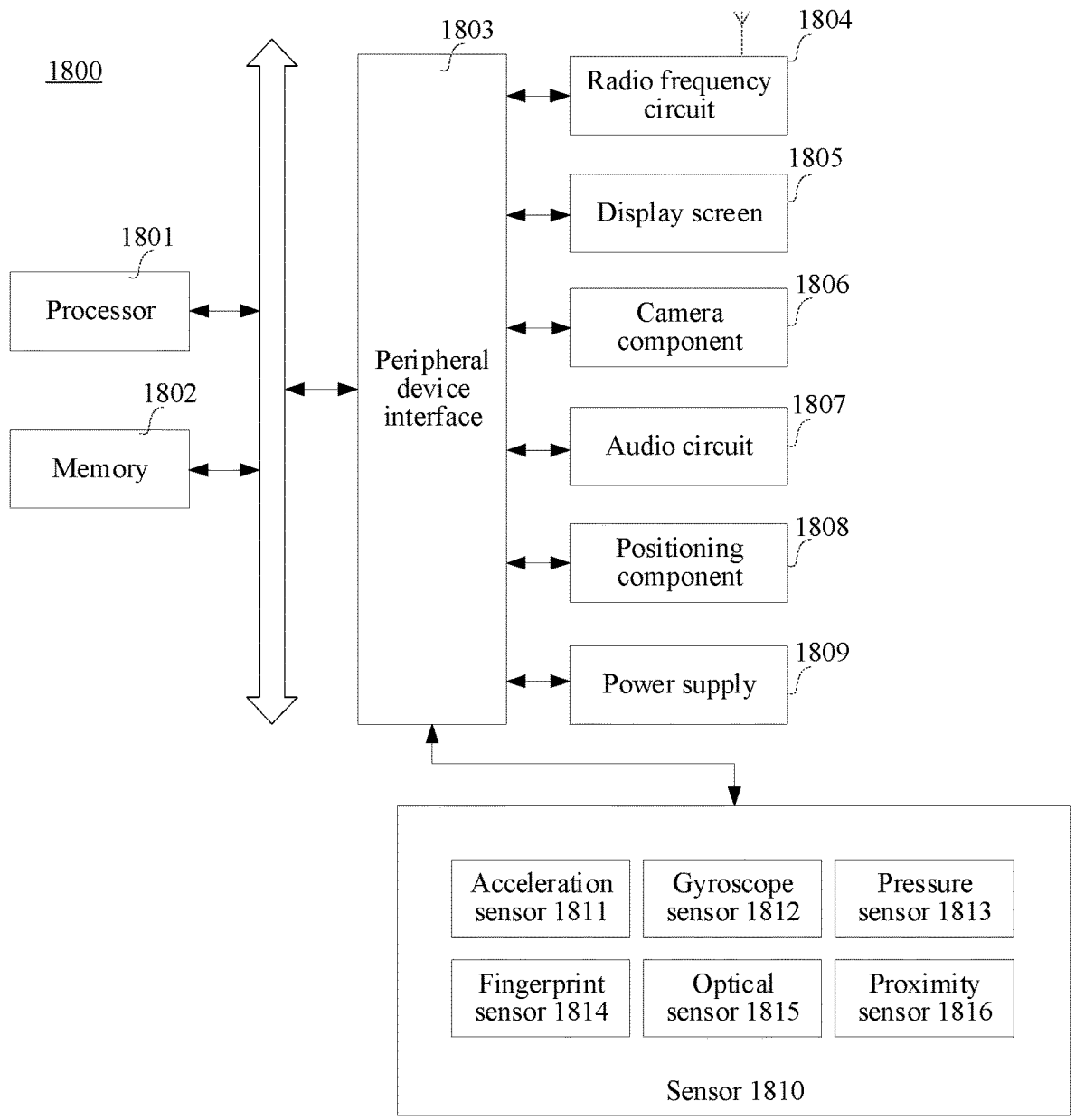
FIG. 18 is a structural block diagram of a terminal according to one or more embodiments of the present disclosure.

FIG. 18 is a structural block diagram of a terminal according to an embodiment of the present disclosure. The terminal 1800 is configured to perform the steps performed by the encoding device in the foregoing embodiments, and may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 1800 may also be referred to as another name such as user equipment, a portable terminal, a laptop terminal, or a desktop terminal.

Generally, the terminal 1800 includes a processor 1801 and a memory 1802.

The processor 1801 may include one or more processing cores, and may be, for example, a 4-core processor or an 8-core processor. The processor 1801 may be implemented in at least one hardware form of a digital signal processor (DSP), a field-programmable gate array (FPGA), and a programmable logic array (PLA). The processor 1801 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 1801 may be integrated with a graphics processing unit (GPU). The GPU is configured to be responsible for rendering and drawing content that a display may need to display. In some embodiments, the processor 1801 may further include an artificial intelligence (AI) processor. The AI processor is configured to process a computing operation related to machine learning.

The memory 1802 may include one or more computer-readable storage media. The computer-readable storage media may be non-transient. The memory 1802 may further include a high-speed random access memory, and a non-volatile memory such as one or more magnetic disk storage devices and a flash memory device. In some embodiments, the non-transitory computer-readable storage medium in the memory 1802 is configured to store at least one instruction, the at least one instruction being executed by the processor 1801 to implement the encoding method provided in the method embodiments of the present disclosure.

In some embodiments, the terminal 1800 may optionally include: a peripheral device interface 1803 and at least one peripheral device. The processor 1801, the memory 1802, and the peripheral device interface 1803 may be connected through a bus or a signal cable. Each peripheral device may be connected to the peripheral device interface 1803 through a bus, a signal cable, or a circuit board. Specifically, the peripheral device include: at least one of a radio frequency (RF) circuit 1804, a display screen 1805, a camera component 1806, an audio circuit 1807, a positioning component 1808, and a power supply 1809.

The peripheral device interface 1803 may be configured to connect at least one peripheral device related to input/output (I/O) to the processor 1801 and the memory 1802. In some embodiments, the processor 1801, the memory 1802, and the peripheral device interface 1803 are integrated into the same chip or circuit board. In some other embodiments, any one or two of the processor 1801, the memory 1802, and the peripheral device interface 1803 may be implemented on an independent chip or circuit board, and the implementation is not limited in this embodiment.

The RF circuit 1804 is configured to receive and transmit a radio frequency (RF) signal, also referred to as an electromagnetic signal. The RF circuit 1804 communicates with a communication network and other communication devices by using the electromagnetic signal. The RF circuit 1804 may convert an electric signal into an electromagnetic signal for transmission, or convert a received electromagnetic signal into an electric signal. Optionally, the RF circuit 1804 includes an antenna system, an RF transceiver, one or more amplifiers, a tuner, an oscillator, a digital signal processor, a codec chip set, a subscriber identity module card, and the like. The RF circuit 1804 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (Wi-Fi) network. In some embodiments, the RF circuit 1804 may also include a circuit related to near field communication (NFC). This is not limited in the present disclosure.

The display screen 1805 is configured to display a user interface (UI). The UI may include a graphic, a text, an icon, a video, and any combination thereof. When the display screen 1805 is a touchscreen, the display screen 1805 is further capable of collecting a touch signal on or above a surface of the display screen 1805. The touch signal may be inputted into the processor 1801 as a control signal for processing. In this case, the display screen 1805 may be further configured to provide a virtual button and/or a virtual keyboard, also referred to as a soft button and/or a soft keyboard. In some embodiments, there may be one display screen 1805, disposed on a front panel of the terminal 1800. In some other embodiments, there may be at least two display screens 1805, respectively disposed on different surfaces of the terminal 1800 or designed in a foldable shape. In still some other embodiments, the display screen 1805 may be a flexible display screen, disposed on a curved surface or a folded surface of the terminal 1800. Even, the display screen 1805 may be further set in a non-rectangular irregular pattern, that is, a special-shaped screen. The display screen 1805 may be manufactured by using a material such as a liquid crystal display (LCD), an organic light-emitting diode (OLED), or the like.

The camera component 1806 is configured to collect an image or a video. Optionally, the camera component 1806 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1806 may further include a flash. The flash may be a single color temperature flash or a double color temperature flash. The double color temperature flash refers to a combination of a warm flash and a cold flash, and may be configured to perform light ray compensation at different color temperatures.

The audio circuit 1807 may include a microphone and a speaker. The speaker is configured to collect sound waves of a user and an environment, and convert the sound waves into electric signals and input the electrical signals into the processor 1801 for processing, or input the electrical signals into the RF circuit 1804 to implement speech communication. For the purpose of stereo sound collection or noise reduction, there may be a plurality of microphones, respectively disposed at different parts of the terminal 1800. The microphone may be further a microphone array or an omnidirectional collection microphone. The speaker is configured to convert electric signals from the processor 1801 or the RF circuit 1804 into sound waves. The speaker may be a conventional thin-film speaker or a piezoelectric ceramic speaker. When the speaker is the piezoelectric ceramic speaker, electric signals not only can be converted into sound waves that can be heard by human, but also can be converted into sound waves that cannot be heard by human for ranging and the like. In some embodiments, the audio circuit 1807 may further include an earphone jack.

The positioning component 1808 is configured to position a current geographic location of the terminal 1800, to implement a navigation or a location based service (LBS). The positioning component 1808 may be a positioning component based on the global positioning system (GPS) of the United States, the BeiDou system of China, the GLONASS system of Russia, or the GALILEO system of the European Union.

The power supply 1809 is configured to supply power to components in the terminal 1800. The power supply 1809 may be an alternating current, a direct current, a primary battery, or a rechargeable battery. When the power supply 1809 includes the rechargeable battery, the rechargeable battery may be a wired rechargeable battery or a wireless rechargeable battery. The rechargeable battery may be further configured to support a fast charge technology.

In some embodiments, the terminal 1800 further includes one or more sensors 1810. The one or more sensors 1810 include, but are not limited to, an acceleration sensor 1811, a gyroscope sensor 1812, a pressure sensor 1813, a fingerprint sensor 1814, an optical sensor 1815, and a proximity sensor 1816.

The acceleration sensor 1811 may detect acceleration on three coordinate axes of a coordinate system established by the terminal 1800. For example, the acceleration sensor 1811 may be configured to detect components of gravity acceleration on the three coordinate axes. The processor 1801 may control, according to a gravity acceleration signal collected by the acceleration sensor 1811, the display screen 1805 to display the user interface in a frame view or a portrait view. The acceleration sensor 1811 may be further configured to collect motion data of a game or a user.

The gyroscope sensor 1812 may detect a body direction and a rotation angle of the terminal 1800. The gyroscope sensor 1812 may cooperate with the acceleration sensor 1811 to collect a 3D action by the user on the terminal 1800. The processor 1801 may implement the following functions according to data collected by the gyroscope sensor 1812: motion sensing (for example, the UI is changed according to a tilt operation of the user), image stabilization during shooting, game control, and inertial navigation.

The pressure sensor 1813 may be disposed on a side frame of the terminal 1800 and/or a lower layer of the display screen 1805. When the pressure sensor 1813 is disposed on the side frame of the terminal 1800, a holding signal of the user on the terminal 1800 may be detected. The processor 1801 performs left and right hand recognition or a quick operation according to the holding signal collected by the pressure sensor 1813. When the pressure sensor 1813 is disposed on the low layer of the display screen 1805, the processor 1801 controls, according to a pressure operation of the user on the display screen 1805, an operable control on the UI. The operable control includes at least one of a button control, a scroll bar control, an icon control, and a menu control.

The fingerprint sensor 1814 is configured to collect a fingerprint of the user. The processor 1801 identifies an identity of the user according to the fingerprint collected by the fingerprint sensor 1814, or the fingerprint sensor 1814 identifies an identity of the user according to the collected fingerprint. When the identity of the user is identified as a trusted identity, the processor 1801 authorizes the user to perform a related sensitive operation. The sensitive operation includes unlocking a screen, viewing encrypted information, downloading software, payment, changing settings, and the like. The fingerprint sensor 1814 may be disposed on a front face, a back face, or a side face of the terminal 1800. When the terminal 1800 is provided with a physical button or a vendor logo, the fingerprint sensor 1814 may be integrated with the physical button or the vendor logo.

The optical sensor 1815 is configured to collect ambient light intensity. In an embodiment, the processor 1801 may control display luminance of the display screen 1805 according to the ambient light intensity collected by the optical sensor 1815. Specifically, when the ambient light intensity is relatively high, the display luminance of the display screen 1805 is increased. When the ambient light intensity is relatively low, the display luminance of the display screen 1805 is reduced. In another embodiment, the processor 1801 may further dynamically adjust shooting parameters of the camera component 1806 according to the ambient light intensity collected by the optical sensor 1815.

The proximity sensor 1816, also referred to as a distance sensor, is usually disposed on the front panel of the terminal 1800. The proximity sensor 1816 is configured to collect a distance between a front face of the user and the front face of the terminal 1800. In an embodiment, when the proximity sensor 1816 detects that the distance between the front face of the user and the front face of the terminal 1800 is gradually decreased, the processor 1801 controls the display screen 1805 to switch from a screen-on state to a screen-off state. When the proximity sensor 1816 detects that the distance between the front face of the user and the front face of the terminal 1800 is gradually increased, the processor 1801 controls the display screen 1805 to switch from the screen-off state to the screen-on state.

A person skilled in the art may understand that the structure shown in FIG. 18 does not constitute a limitation to the terminal 1800, and the terminal may include more components or fewer components than those shown in the figure, or some components may be combined, or a different component deployment may be used.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 19:
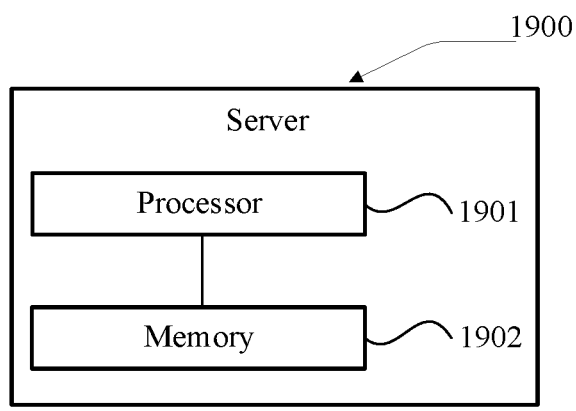
FIG. 19 is a schematic structural diagram of a server according to one or more embodiments of the present disclosure.

FIG. 19 is a schematic structural diagram of a server according to an embodiment of the present disclosure. The server 1900 may vary greatly due to different configurations or performance, and may include one or more central processing units (CPUs) 1901 and one or more memories 1902. The memory 1902 stores at least one instruction, the at least one instruction being loaded and executed by the processor 1901 to implement the methods provided in the foregoing method embodiments. In certain embodiments, the server may further include components such as a wired or wireless network interface, a keyboard, and an input/output interface, to facilitate inputs/outputs. The server may further include another component configured to implement functions of a device, and details are not described herein again.

The server 1900 may be configured to perform the steps performed by the encoding device in the encoding method provided in the foregoing embodiments.

An embodiment of the present disclosure further provides an encoding device, including one or more processors and one or more memories, the one or more memories storing at least one computer-readable instruction, a code set, or an instruction set, and the computer-readable instruction, the code set, or the instruction set being loaded and executed by the one or more processors to implement operations performed in the encoding method in the foregoing embodiments.

An embodiment of the present disclosure further provides a computer-readable storage medium, storing at least one computer-readable instruction, a code set, or an instruction set, the computer-readable instruction, the code set, or the instruction set being loaded and executed by one or more processors to perform operations performed in the encoding method according to the foregoing embodiments.

A person of ordinary skill in the art may understand that all or some of the steps of the embodiments may be implemented by hardware, or may be implemented by a program instructing related hardware. The program may be stored in a computer-readable storage medium. The storage medium mentioned above may include: a read-only memory, a magnetic disk, or an optical disc.

The foregoing descriptions are merely directed to certain embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An encoding method, performed by an encoding device, the method comprising:
   obtaining a target paragraph and a preset database, and inputting the target paragraph and the preset database into a memory encoding model, the target paragraph including at least one sentence, and the memory encoding model including at least an input layer, a first memory layer, a first gating layer that includes a linear network model, and an output layer;
   obtaining, by the input layer, an original vector set of the target paragraph and a knowledge vector set of the preset database, the original vector set including a sentence vector of each sentence in the target paragraph, and the knowledge vector set including knowledge vectors of a plurality of pieces of knowledge data in the preset database;
   obtaining, by the first memory layer, a first target sentence matrix of the original vector set according to the original vector set and the knowledge vector set, the first target sentence matrix being configured to describe the target paragraph according to an association relationship between the original vector set and the knowledge vector set;
   obtaining, by the output layer, a paragraph vector of the target paragraph according to a second target sentence matrix, the second target sentence matrix being determined by:
      inputting the first target sentence matrix to the first gating layer;
      obtaining a linear value corresponding to the original vector set by applying the linear network model, processing the linear value by using a preset function, to obtain a first weight of the original vector set;
      calculating a difference between 1 and the first weight, to obtain a second weight of the first target sentence matrix; and
      performing, in the first gating layer, weighted summation on the original vector set and the first target sentence matrix according to the first weight and the second weight, to obtain the second target sentence matrix; and
   performing processing based on the paragraph vector.

2. The method according to claim 1, wherein the input layer includes a sentence encoding model, and the obtaining, by the input layer, the original vector set of the target paragraph and the knowledge vector set of the preset database comprises:
   obtaining, according to a word vector of each word in the each sentence in the target paragraph, the sentence vector of the each sentence by applying the sentence encoding model, to obtain the original vector set; and
   obtaining the knowledge vector set according to a knowledge vector of each piece of knowledge data in the preset database.

3. The method according to claim 2, wherein the sentence encoding model comprises a first sentence encoding submodel and a second sentence encoding submodel, and the obtaining, according to the word vector of each word in the each sentence in the target paragraph, the sentence vector of the each sentence by applying the sentence encoding model comprises:
   obtaining a plurality of word vectors according to the word vector of the each word in the each sentence in the target paragraph;
   performing forward-order encoding on the plurality of word vectors by applying the first sentence encoding submodel, to obtain a first vector;
   performing reverse-order encoding on the plurality of word vectors by applying the second sentence encoding submodel, to obtain a second vector; and
   obtaining the sentence vector of the each sentence according to the first vector and the second vector.

4. The method according to claim 1, further comprising:
   obtaining each piece of knowledge data in the preset database; and
   performing, for the each piece of knowledge data, word segmentation on the knowledge data, to obtain at least one word, obtaining a word vector of the at least one word, obtaining a knowledge vector of the knowledge data according to the word vector of the at least one word, and correspondingly storing the knowledge vector and the knowledge data in the preset database.

5. The method according to claim 1, wherein the first memory layer includes a first memory model, and the obtaining, in the first memory layer, the first target sentence matrix of the original vector set according to the original vector set and the knowledge vector set comprises:
   obtaining, by the first memory layer, a first knowledge matrix and a second knowledge matrix that correspond to the knowledge vector set by applying the first memory model; and
   obtaining the first target sentence matrix of the original vector set according to the original vector set, the first knowledge matrix, and the second knowledge matrix.

6. The method according to claim 1, wherein
performing, in the first gating layer, weighted summation on the original vector set and the first target sentence matrix, to obtain the second target sentence matrix comprises: making each value in the second target sentence matrix fall within a preset value range.

7. The method according to claim 6, wherein the performing, by the first gating layer, weighted summation on the original vector set and the first target sentence matrix, to obtain the second target sentence matrix comprises:
obtaining the linear value corresponding to the original vector set by applying the linear network model, processing the linear value by using the preset function, to obtain the first weight of the original vector set, and making the first weight fall within the preset value range.

8. The method according to claim 1, wherein the obtaining, in the output layer, the paragraph vector of the target paragraph according to the second sentence matrix comprises:
performing column summation on the first target sentence matrix to obtain the paragraph vector.

9. The method according to claim 1, further comprising:
using the first target sentence matrix as an updated original vector set and the knowledge vector set, repeatedly performing, in the first memory layer, the operation of obtaining a target sentence matrix according to the updated original vector set and the knowledge vector set until a quantity of repetitions reaches a preset quantity of times, and obtaining, in the output layer, the paragraph vector of the target paragraph according to a current target sentence matrix.

10. The method according to claim 1, wherein the memory encoding model further comprises a second memory layer located before the first memory layer, and the method further comprises:
obtaining, by the input layer, a memory vector set of the target paragraph, the memory vector set including a word vector of each word in a context sentence of the target paragraph; and
inputting the original vector set and the memory vector set into the second memory layer, and obtaining, by the second memory layer, a third target sentence matrix of the original vector set according to the original vector set and the memory vector set, the third target sentence matrix being configured to describe the target paragraph according to an association relationship between the original vector set and the memory vector set; and
the obtaining, by the first memory layer, a first target sentence matrix of the original vector set according to the original vector set and the knowledge vector set comprises:
inputting the third target sentence matrix into the first memory layer, and obtaining, in the first memory layer, the first target sentence matrix of the original vector set according to the third target sentence matrix and the knowledge vector set.

11. The method according to claim 10, wherein the memory encoding model further includes a second gating layer located before the first memory layer and behind the second memory layer, and the method further comprises:
inputting the third target sentence matrix into the second gating layer, performing, in the second gating layer, weighted summation on the original vector set and the third target sentence matrix, to obtain a fourth target sentence matrix, and making each value in the fourth target sentence matrix fall within a preset value range; and
the obtaining, by the first memory layer, the first target sentence matrix of the original vector set according to the third target sentence matrix and the knowledge vector set comprises: inputting the fourth target sentence matrix into the first memory layer, and obtaining, in the first memory layer, the first target sentence matrix of the original vector set according to the fourth target sentence matrix and the knowledge vector set.

12. The method according to claim 1, wherein the memory encoding model further includes a third memory layer located behind the first memory layer, and the method further comprises:
obtaining, by the input layer, a memory vector set of the target paragraph, the memory vector set including a word vector of each word in a context sentence of the target paragraph; and
the obtaining, by the output layer, a paragraph vector of the target paragraph according to the second target sentence matrix comprises:
inputting the memory vector set into the third memory layer, and obtaining, by the third memory layer, a fifth target sentence matrix of the original vector set according to the first target sentence matrix and the memory vector set, the fifth target sentence matrix being configured to describe the target paragraph according to an association relationship among the original vector set, the knowledge vector set, and the memory vector set; and
obtaining, by the output layer, the paragraph vector of the target paragraph according to the fifth target sentence matrix.

13. The method according to claim 12, wherein the memory encoding model further includes a third gating layer located behind the third memory layer, and the obtaining, in the output layer, the paragraph vector of the target paragraph according to the fifth target sentence matrix comprises:
inputting the fifth target sentence matrix into the third gating layer, performing, in the third gating layer, weighted summation on the first target sentence matrix and the fifth target sentence matrix, to obtain a sixth target sentence matrix, and making each value in the sixth target sentence matrix fall within a preset value range; and
obtaining, by the output layer, the paragraph vector of the target paragraph according to the sixth target sentence matrix.

14. An encoding apparatus, comprising: a memory storing computer program instructions; and a processor coupled to the memory and configured to execute the computer program instructions and perform:
inputting a target paragraph and a preset database into a memory encoding model, the target paragraph including at least one sentence, and the memory encoding model including at least an input layer, a first memory layer, a first gating layer that includes a linear network model, and an output layer;
obtaining an original vector set of the target paragraph and a knowledge vector set of the preset database, the original vector set including a sentence vector of each sentence in the target paragraph, and the knowledge vector set including knowledge vectors of a plurality of pieces of knowledge data in the preset database;
obtaining a first target sentence matrix of the original vector set according to the original vector set and the knowledge vector set, the first target sentence matrix being configured to describe the target paragraph according to an association relationship between the original vector set and the knowledge vector set;
obtaining a paragraph vector of the target paragraph according to a second target sentence matrix, the second target sentence matrix being determined by:
inputting the first target sentence matrix to the first gating layer;

obtaining a linear value corresponding to the original vector set by applying the linear network model, processing the linear value by using a preset function, to obtain a first weight of the original vector set;

calculating a difference between 1 and the first weight, to obtain a second weight of the first target sentence matrix; and performing, in the first gating layer, weighted summation on the original vector set and the first target sentence matrix according to the first weight and the second weight, to obtain the second target sentence matrix; and performing processing based on the paragraph vector.

15. The apparatus according to claim 14, wherein the processor is further configured to perform:

obtaining, according to a word vector of each word in the each sentence in the target paragraph, the sentence vector of the each sentence by applying the sentence encoding model, to obtain the original vector set; and obtaining the knowledge vector set according to a knowledge vector of each piece of knowledge data in the preset database.

16. The apparatus according to claim 14, wherein the processor is further configured to perform:

performing weighted summation on the original vector set and the first target sentence matrix, to obtain a second target sentence matrix, and making each value in the second target sentence matrix fall within a preset value range; and obtaining the paragraph vector of the target paragraph according to the second target sentence matrix.

17. The apparatus according to claim 14, wherein the processor is further configured to perform:

obtaining a memory vector set of the target paragraph, the memory vector set including a word vector of each word in a context sentence of the target paragraph;

obtaining a third target sentence matrix of the original vector set according to the original vector set and the memory vector set, the third target sentence matrix being configured to describe the target paragraph according to an association relationship between the original vector set and the memory vector set; and obtaining the first target sentence matrix of the original vector set according to the third target sentence matrix and the knowledge vector set.

18. The apparatus according to claim 17, wherein the processor is further configured to perform:

performing weighted summation on the original vector set and the third target sentence matrix, to obtain a fourth target sentence matrix, and making each value in the fourth target sentence matrix fall within a preset value range; and obtaining the first target sentence matrix of the original vector set according to the fourth target sentence matrix and the knowledge vector set.

19. A non-transitory computer-readable storage medium storing computer program instructions executable by at least one processor to perform:

inputting a target paragraph and a preset database into a memory encoding model, the target paragraph including at least one sentence, and the memory encoding model including at least an input layer, a first memory layer, a first gating layer that includes a linear network model, and an output layer;

obtaining, in the input layer, an original vector set of the target paragraph and a knowledge vector set of the preset database, the original vector set including a sentence vector of each sentence in the target paragraph, and the knowledge vector set including knowledge vectors of a plurality of pieces of knowledge data in the preset database;

obtaining, in the first memory layer, a first target sentence matrix of the original vector set according to the original vector set and the knowledge vector set, the first target sentence matrix being configured to describe the target paragraph according to an association relationship between the original vector set and the knowledge vector set;

obtaining, in the output layer, a paragraph vector of the target paragraph according to a second target sentence matrix, the second target sentence matrix being determined by:

inputting the first target sentence matrix to the first gating layer;

obtaining a linear value corresponding to the original vector set by applying the linear network model, processing the linear value by using a preset function, to obtain a first weight of the original vector set;

calculating a difference between 1 and the first weight, to obtain a second weight of the first target sentence matrix; and performing, in the first gating layer, weighted summation on the original vector set and the first target sentence matrix according to the first weight and the second weight, to obtain the second target sentence matrix; and performing processing based on the paragraph vector.

20. The non-transitory computer-readable storage medium according to claim 19, wherein the computer program instructions are further executable by the at least one processor to perform:

obtaining, according to a word vector of each word in the each sentence in the target paragraph, the sentence vector of the each sentence by applying the sentence encoding model, to obtain the original vector set; and obtaining the knowledge vector set according to a knowledge vector of each piece of knowledge data in the preset database.

* * * * *